(12) United States Patent
Imai et al.

(10) Patent No.: US 9,430,762 B2
(45) Date of Patent: Aug. 30, 2016

(54) FEE MANAGEMENT SYSTEM, TRANSMISSION SYSTEM, AND FEE MANAGEMENT METHOD

(71) Applicants: Takuya Imai, Tokyo (JP); Kenichiro Morita, Tokyo (JP); Shoh Nagamine, Kanagawa (JP)

(72) Inventors: Takuya Imai, Tokyo (JP); Kenichiro Morita, Tokyo (JP); Shoh Nagamine, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 267 days.

(21) Appl. No.: 14/166,126

(22) Filed: Jan. 28, 2014

(65) Prior Publication Data

US 2014/0244460 A1      Aug. 28, 2014

(30) Foreign Application Priority Data

Feb. 28, 2013   (JP) ................ 2013-038766

(51) Int. Cl.
*G07F 19/00*   (2006.01)
*G06Q 20/14*   (2012.01)

(52) U.S. Cl.
CPC ................. *G06Q 20/145* (2013.01)

(58) Field of Classification Search
CPC .................................. G06Q 20/145
USPC ........................... 705/34, 52, 412
See application file for complete search history.

(56) References Cited

U.S. PATENT DOCUMENTS

| | | | | |
|---|---|---|---|---|
| 5,844,973 A | * | 12/1998 | Venkatraman | H04M 3/56 379/116 |
| 6,023,499 A | * | 2/2000 | Mansey | H04M 3/56 379/111 |
| 2004/0117311 A1 | * | 6/2004 | Agarwal | G06Q 20/102 705/52 |
| 2011/0314099 A1 | | 12/2011 | Imai et al. | |

FOREIGN PATENT DOCUMENTS

| | | |
|---|---|---|
| JP | 09-172509 | 6/1997 |
| JP | 2013-077190 | 4/2013 |
| WO | 2013/047903 A1 | 4/2013 |

OTHER PUBLICATIONS

U.S. Appl. No. 13/989,653, filed Oct. 18, 2012.

* cited by examiner

*Primary Examiner* — Hunter Wilder
(74) *Attorney, Agent, or Firm* — Oblon, McClelland, Maier & Neustadt, L.L.P.

(57) ABSTRACT

A disclosed fee management system is for managing attending fees that are charged when transmission terminals attend a conversation in a transmission management system, which manages transmission of information associated with the conversation between the transmission terminals. The fee management system includes an acquisition unit configured to acquire attending hours information and conversation quality information, the attending hours information indicating attending hours for which the respective transmission terminals have attended the conversation, the conversation quality information indicating conversation communication service quality provided during the conversation; an attending hours computing unit configured to compute total attending hours based on the attending hours information, the total attending hours indicating hours for which the terminal has attended the conversation; and an attending fee computing unit configured to compute an attending fee for each of the terminals based on the corresponding total attending hours and the conversation quality information.

8 Claims, 21 Drawing Sheets

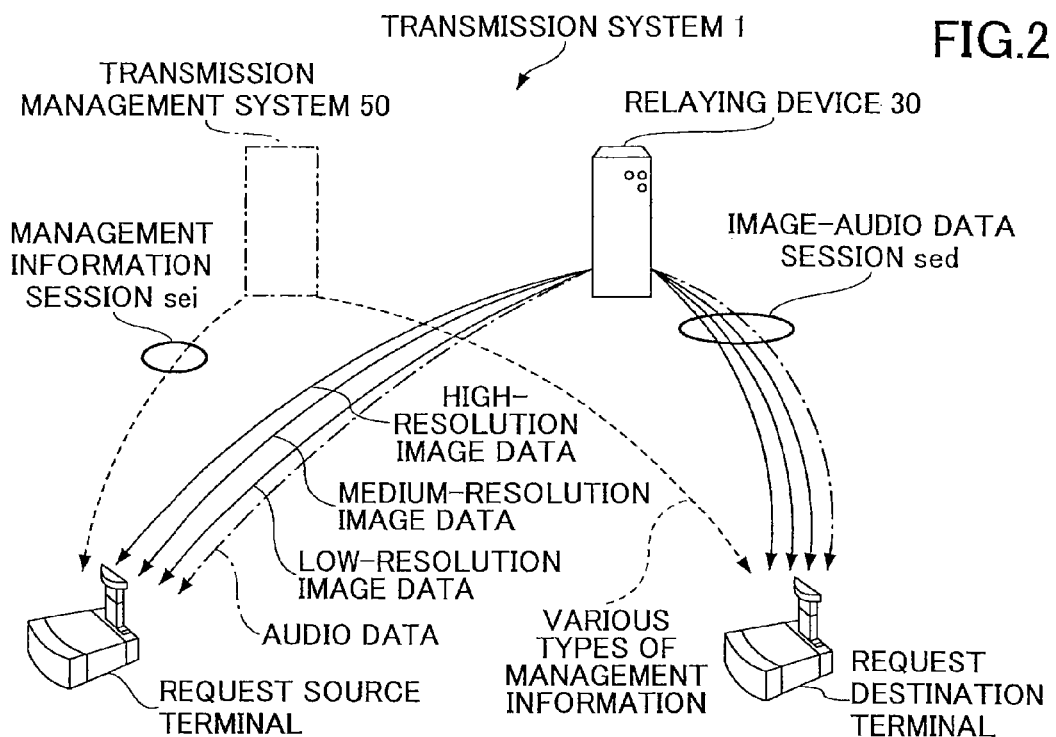
FIG.2
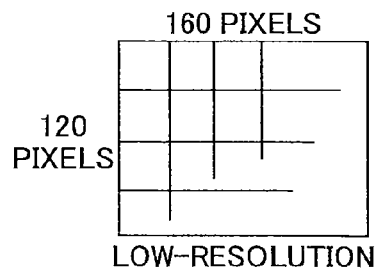
FIG.3A LOW-RESOLUTION
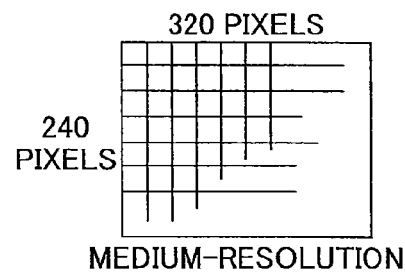
FIG.3B MEDIUM-RESOLUTION
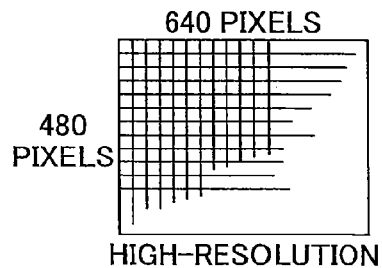
FIG.3C HIGH-RESOLUTION

PROCESS RULE MANAGEMENT TABLE (T)  FIG.8

| PROCESS START REQUIRE-MENT (COMMUNI-CATIONS STATUS) | POST-PROCESS TARGET TABLE | POST-PROCESS TARGET RECORD | PROCESS CONTENTS |
|---|---|---|---|
| COMMUNI-CATIONS STATUS= "invite" | CONFERENCE HISTORY MANAGEMENT TABLE (t2) | RECORDS HAVING IDENTICAL CONFERENCE ID | CONFERENCE ID=*CONFERENCE ID* ORGANIZER TERMINAL ID =*TRANSMITTING SOURCE TERMINAL ID* |
| COMMUNI-CATIONS STATUS= "start" | CONFERENCE HISTORY MANAGEMENT TABLE (t2) | RECORDS HAVING IDENTICAL CONFERENCE ID | CONFERENCE ID=*CONFERENCE ID* START DATE AND TIME =*COMMUNICATING DATE AND TIME* CONFERENCE HOURS=END DATE AND TIME −*COMMUNICATING DATE AND TIME* |
| COMMUNI-CATIONS STATUS= "end" | CONFERENCE HISTORY MANAGEMENT TABLE (t2) | RECORDS HAVING IDENTICAL CONFERENCE ID | CONFERENCE ID=*CONFERENCE ID* END DATE AND TIME =*COMMUNICATING DATE AND TIME* CONFERENCE HOURS=*COMMUNICATING DATE AND TIME* −START DATE AND TIME |
| COMMUNI-CATIONS STATUS= "join" | ATTENDEE HISTORY MANAGEMENT TABLE (t1) | RECORDS HAVING IDENTICAL CONFERENCE SESSION ID | TERMINAL ID=*TRANSMITTING SOURCE TERMINAL ID* CONFERENCE ID=*CONFERENCE ID* CONFERENCE SESSION ID=*CONFERENCE SESSION ID* ATTENDING DATE AND TIME =*COMMUNICATING DATE AND TIME* ATTENDING HOURS=(EXIT DATE AND TIME −*COMMUNICATING DATE AND TIME*) EXIT STATUS=" CONFERENCE IN PROGRESS" |
| COMMUNI-CATIONS STATUS= "leave" | ATTENDEE HISTORY MANAGEMENT TABLE (t1) | RECORDS HAVING IDENTICAL CONFERENCE SESSION ID | TERMINAL ID=*TRANSMITTING SOURCE TERMINAL ID* CONFERENCE ID=*CONFERENCE ID* CONFERENCE SESSION ID=*CONFERENCE SESSION ID* EXIT DATE AND TIME =*COMMUNICATING DATE AND TIME* ATTENDING HOURS =(*COMMUNICATING DATE AND TIME* −ATTENDING DATE AND TIME) EXIT STATUS=" NORMAL" CONVERSATION QUALITY=*CONVERSATION QUALITY* |
| COMMUNI-CATIONS STATUS= "offline" CONFERENCE ID !=null CONFERENCE SESSION ID !=null | ATTENDEE HISTORY MANAGEMENT TABLE (t1) | RECORDS HAVING IDENTICAL CONFERENCE SESSION ID | TERMINAL ID=*TRANSMITTING SOURCE TERMINAL ID* CONFERENCE ID=*CONFERENCE ID* CONFERENCE SESSION ID=*CONFERENCE SESSION ID* EXIT DATE AND TIME =*COMMUNICATING DATE AND TIME* ATTENDING HOURS=(*COMMUNICATING DATE AND TIME* −ATTENDING DATE AND TIME) EXIT STATUS=" FORCED TERMINATION" CONVERSATION QUALITY=*CONVERSATION QUALITY* |
| . . . | . . . | . . . | . . . |

FIG.9

| COMMUNI-CATIONS STATUS | REQUEST SOURCE TERMINAL ID | DESTINA-TION TERMINAL ID | SESSION ID | CONFER-ENCE ID | CONFER-ENCE SESSION ID | COMMUNI-CATIONS DATE AND TIME | CONVER-SATION QUALITY |
|---|---|---|---|---|---|---|---|
| online | 110001 | · | se001 | · | · | 2010-09-01 09:30:00 | · |
| online | 110002 | · | se002 | · | · | 2010-09-01 09:30:00 | · |
| online | 110003 | · | se003 | · | · | 2010-09-01 09:30:00 | · |
| invite | 110001 | 110002 | · | conf001 | · | 2010-09-01 09:59:50 | · |
| accept | 110002 | 110001 | · | conf001 | · | 2010-09-01 09:59:59 | · |
| start | 110001 | · | · | conf001 | · | 2010-09-01 10:00:00 | · |
| join | 110001 | · | · | conf001 | cse001 | 2010-09-01 10:00:00 | · |
| join | 110002 | · | · | conf001 | cse002 | 2010-09-01 10:00:00 | · |
| call | 110003 | 110001 | · | conf001 | · | 2010-09-01 10:09:50 | · |
| accept | 110001 | 110003 | · | conf001 | · | 2010-09-01 10:09:59 | · |
| join | 110003 | · | · | conf001 | cse003 | 2010-09-01 10:10:00 | · |
| leave | 110002 | · | · | conf001 | cse002 | 2010-09-01 10:40:00 | 70 |
| offline | 110003 | · | se003 | conf001 | cse003 | 2010-09-01 11:30:25 | 80 |
| leave | 110001 | · | · | conf001 | cse001 | 2010-09-01 11:30:25 | 100 |
| end | 110001 | · | · | conf001 | · | 2010-09-01 11:30:25 | · |
| offline | 110001 | · | se001 | · | · | 2010-09-01 11:35:00 | · |
| offline | 110002 | · | se002 | · | · | 2010-09-01 11:40:00 | · |
| ... | ... | ... | ... | ... | ... | ... | ... |
| online | 110005 | · | se005 | · | · | 2010-09-12 14:20:00 | · |
| online | 110006 | · | se006 | · | · | 2010-09-12 14:21:00 | · |
| invite | 110005 | 110006 | · | conf002 | · | 2010-09-12 14:29:50 | · |
| accept | 110006 | 110005 | · | conf002 | · | 2010-09-12 14:29:55 | · |
| start | 110005 | · | · | conf002 | · | 2010-09-12 14:30:00 | · |
| join | 110005 | · | · | conf002 | cse005 | 2010-09-12 14:30:00 | · |
| ... | ... | ... | ... | ... | ... | ... | ... |

FIG.10A

ATTENDING HISTORY MANAGEMENT TABLE (t1)

| HISTORY ID | TERMINAL ID | CONFER-ENCE ID | CONFERENCE SESSION ID | ATTENDING DATE AND TIME | EXIT DATE AND TIME | ATTENDING HOURS | EXIT STATUS | CONVERSA-TION QUALITY |
|---|---|---|---|---|---|---|---|---|
| 001 | 110001 | conf001 | cse001 | 2010-09-01 10:00:00 | 2010-09-01 11:30:25 | 01:30:25 | EXIT | 100 |
| 002 | 110002 | conf001 | cse002 | 2010-09-01 10:00:00 | 2010-09-01 10:40:00 | 00:40:00 | EXIT | 70 |
| 003 | 110003 | conf001 | cse003 | 2010-09-01 10:10:00 | 2010-09-01 11:30:25 | 01:20:25 | FORCED TERMINATION | 80 |
| 004 | 110005 | conf002 | cse005 | 2010-09-12 14:30:00 | 2010-09-12 15:35:25 | 01:05:25 | EXIT | 80 |
| 005 | 110001 | conf002 | cse005 | 2010-09-12 14:30:00 | 2010-09-12 15:40:10 | 01:10:10 | EXIT | 100 |
| 006 | 110002 | conf002 | cse005 | 2010-09-12 14:33:35 | 2010-09-12 15:40:10 | 01:06:35 | EXIT | 90 |
| ... | ... | ... | ... | ... | ... | ... | ... | ... |

FIG.10B

CONFERENCE HISTORY MANAGEMENT TABLE (t2)

| CONFERENCE ID | ORGANIZER TERMINAL ID | CONFERENCE START DATE AND TIME | CONFERENCE END DATE AND TIME | CONFERENCE HOURS |
|---|---|---|---|---|
| conf001 | 110001 | 2010-09-01 10:00:00 | 2010-09-01 11:30:25 | 01:30:25 |
| conf002 | 110005 | 2010-09-12 14:30:00 | — | — |
| ⋮ | ⋮ | ⋮ | ⋮ | ⋮ |

FIG.12

USER MANAGEMENT TABLE (Ty)

| CONTRACT NUMBER | USER ID | USER NAME | USER ADDRESS | USER PHONE NUMBER | USER EMAIL ADDRESS | TERMINAL ID |
|---|---|---|---|---|---|---|
| 20101005-0001 | a123 | AAA | Tokyo··· | ······ | ······ | 110001 |
| | | | | | | 110002 |
| | | | | | | 110003 |
| | | | | | | ⋮ |
| 20110105-0001 | b234 | BBB | Osaka··· | ······ | ······ | 110011 |
| | | | | | | 110012 |
| | | | | | | 110013 |
| | | | | | | ⋮ |
| 20110110-0001 | c345 | CCC | New York··· | ······ | ······ | 110021 |
| | | | | | | 110022 |
| | | | | | | 110023 |
| | | | | | | ⋮ |
| 20110110-0002 | d456 | DDD | Washington,D.C.··· | ······ | ······ | 110031 |
| | | | | | | 110032 |
| | | | | | | 110033 |
| | | | | | | ⋮ |
| ⋮ | ⋮ | ⋮ | ⋮ | ⋮ | ⋮ | ⋮ |

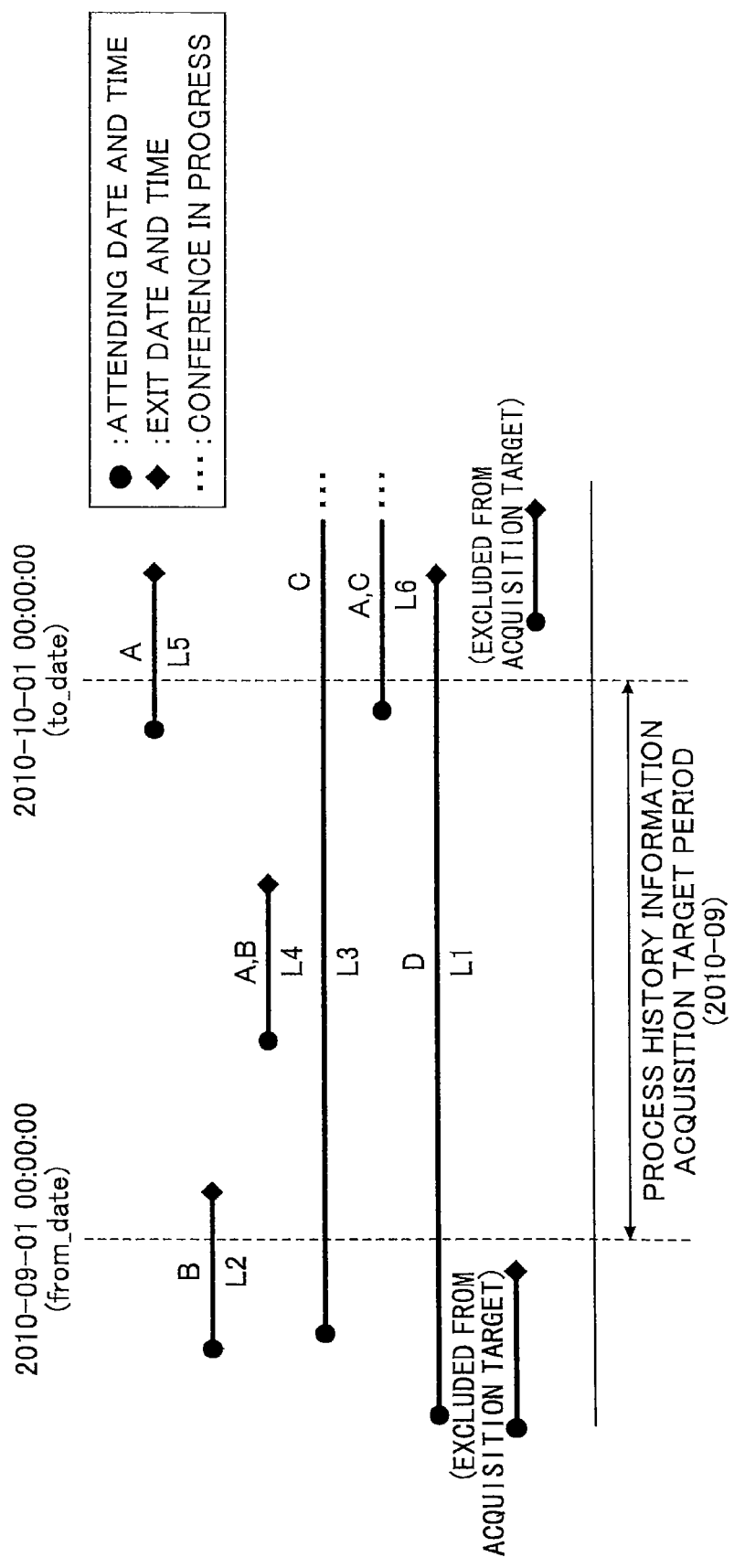

FIG.15B

SEARCH REQUIREMENT A : (TERMINAL ID=TERMINAL ID OF ACQUISITION REQUEST SOURCE TERMINAL)&&
(from_date≦ATTENDING DATE AND TIME)&&(ATTENDING DATE AND TIME<to_date)

SEARCH REQUIREMENT B : (TERMINAL ID=TERMINAL ID OF ACQUISITION REQUEST SOURCE TERMINAL)&&
(from_date≦EXIT DATE AND TIME)&&(EXIT DATE AND TIME<to_date)

SEARCH REQUIREMENT C : (TERMINAL ID=TERMINAL ID OF ACQUISITION REQUEST SOURCE TERMINAL)&&
(EXIT STATUS='' CONFERENCE IN PROGRESS'')&&
(ATTENDING DATE AND TIME<to_date)

SEARCH REQUIREMENT D : (TERMINAL ID=TERMINAL ID OF ACQUISITION REQUEST SOURCE TERMINAL)&&
(ATTENDING HOURS≦to_date-from_date)&&
(ATTENDING DATE AND TIME<from_date)&&(EXIT DATE AND TIME≧to_date)

FIG.16

COMMUNICATIONS TERMINAL SETTING UTILITY ~1001    HELP  LOGOUT

TERMINAL ID:110001

MAIN MENU > CONFERENCE HISTORY ~1002

CONFERENCE HISTORY (SEPTEMBER, 2010)

▼ SEPTEMBER, 2010 ▶ ▲ ~1003

~1004

| ATTENDING DATE AND TIME | EXIT DATE AND TIME | ATTENDING HOURS | ORGANIZER TERMINAL ID | CONFERENCE START DATE AND TIME | CONFERENCE END DATE AND TIME | CONFER -ENCE HOURS | EXIT STATUS | CONVERSA -TION QUALITY |
|---|---|---|---|---|---|---|---|---|
| 2010-09-01 10:00:00 | 2010-09-01 11:30:25 | 01:30:25 | 110001 | 2010-09-01 10:00:00 | 2010-09-01 11:30:25 | 01:30:25 | EXIT | 100 |
| 2010-09-02 15:10:00 | 2010-09-02 15:30:40 | 00:20:40 | 110003 | 2010-09-02 14:50:00 | 2010-09-02 16:50:00 | 02:00:00 | EXIT | 80 |
| 2010-09-05 13:00:00 | 2010-09-05 14:00:00 | 01:00:00 | 110002 | 2010-09-05 13:00:00 | 2010-09-05 14:30:00 | 01:30:00 | FORCED TERMINA -TION | 80 |
| 2010-09-12 18:01:10 | 2010-09-12 20:30:45 | 02:29:35 | 110005 | 2010-09-12 18:00:00 | 2010-09-12 20:31:00 | 02:31:00 | EXIT | 90 |

FIG.18

| USER ID | TERMINAL ID | TOTAL ATTENDING HOURS FOR EACH TERMINAL | AVERAGE CONVERSATION QUALITY | ATTENDING FEE FOR EACH TERMINAL | ATTENDING FEE FOR EACH USER |
|---|---|---|---|---|---|
| a123 | 110001 | 21 hr 32 min | 80 | ¥10,336 | ¥24,554 |
| | 110002 | 17 hr 54 min | 70 | ¥7,518 | |
| | 110003 | 11 hr 10 min | 100 | ¥6,700 | |
| b234 | 110001 | 14 hr 47 min | 100 | ¥8,870 | ¥26,793 |
| | 110001 | 12 hr 35 min | 95 | ¥7,173 | |
| | 110001 | 11 hr 10 min | 100 | ¥10,750 | |
| c345 | 110001 | 22 hr 03 min | 98 | ¥12,965 | ¥34,474 |
| | 110001 | 20 hr 45 min | 100 | ¥12,450 | |
| | 110001 | 15 hr 15 min | 99 | ¥9,059 | |
| d456 | 110001 | 8 hr 45 min | 100 | ¥5,250 | ¥16,864 |
| | 110001 | 16 hr 38 min | 100 | ¥9,980 | |
| | 110001 | 2 hr 45 min | 99 | ¥1,634 | |
| ... | ... | ... | ... | ... | ... |

FIG.19A

ATTENDING HISTORY MANAGEMENT TABLE (t11)

| HISTORY ID | TERMINAL ID | CONFERENCE ID | CONFERENCE SESSION ID | ATTENDING DATE AND TIME | EXIT DATE AND TIME | ATTENDING HOURS | EXIT STATUS | CONVERSATION QUALITY | DEFICIENCY FLAG |
|---|---|---|---|---|---|---|---|---|---|
| 001 | 110001 | conf001 | cse001 | 2010-09-01 10:00:00 | 2010-09-01 11:30:25 | 01:30:25 | EXIT | 100 | 1 |
| 002 | 110002 | conf001 | cse002 | 2010-09-01 10:00:00 | 2010-09-01 10:40:00 | 00:40:00 | EXIT | 70 | 1 |
| 003 | 110003 | conf001 | cse003 | 2010-09-01 10:10:00 | 2010-09-01 11:30:25 | 01:20:25 | FORCED TERMINATION | 80 | 1 |
| 004 | 110005 | conf002 | cse005 | 2010-09-12 14:30:00 | 2010-09-12 15:35:25 | 01:05:25 | EXIT | 80 | 1 |
| 005 | 110001 | conf002 | cse005 | 2010-09-12 14:30:00 | 2010-09-12 15:40:10 | 01:10:10 | EXIT | 100 | 1 |
| 006 | 110002 | conf002 | cse005 | 2010-09-12 14:33:35 | 2010-09-12 15:40:10 | 01:06:35 | EXIT | 90 | 1 |
| ... | ... | ... | ... | ... | ... | ... | ... | ... | ... |

FIG.19B

CONFERENCE HISTORY MANAGEMENT TABLE (t12)

| CONFERENCE ID | ORGANIZER TERMINAL ID | CONFERENCE START DATE AND TIME | CONFERENCE END DATE AND TIME | CONFERENCE HOURS | DEFICIENCY FLAG |
|---|---|---|---|---|---|
| conf001 | 110001 | 2010-09-01 10:00:00 | 2010-09-01 11:30:25 | 01:30:25 | 1 |
| conf002 | 110005 | 2010-09-12 14:30:00 | — | — | 1 |
| ... | ... | ... | ... | ... | ... |

FEE MANAGEMENT SYSTEM, TRANSMISSION SYSTEM, AND FEE MANAGEMENT METHOD

BACKGROUND OF THE INVENTION

1. Field of the Invention

The disclosures herein are generally related to a fee management system, a transmission system, and a fee management method.

2. Description of the Related Art

There has been a dramatic increase in the number of people who remotely hold conversations with each other using transmission terminals such as PCs (personal computers) or mobile phones. Further, such a conversation (e.g., conference) may be held not only between the two locations (two people) but also be held between multiple locations (three or more people).

Further, an administrator who administers communications service for holding the conversation between the transmission terminals (users) obtains profits by charging each of users of the transmission terminals a communication fee. Japanese Laid-open Patent Publication No. 9-172509 (hereinafter referred to as "Patent Document 1") discloses a method of equally charging each of attendees of the conversation a communication fee from a start to an end of the conversation. This method manages communication fees of multiple locations so as to efficiently manage the communications fees for an entire conference. More specifically, this method pertains to a method for controlling a multiple location conference that is simultaneously held at three or more locations. The method includes managing communication fees of conference attending terminals (i.e., terminals used by conference attendees) and a communication fee of a multiple location conference control apparatus.

RELATED ART DOCUMENTS

Patent Document

Patent Document 1: Japanese Laid-open Patent Publication No. 9-172509

SUMMARY OF THE INVENTION

It is a general object of at least one embodiment of the present invention to provide a fee management system, a transmission system, and a fee management method that substantially obviate one or more problems caused by the limitations and disadvantages of the related art.

According to one aspect of the embodiment, there is provided a fee management system for managing attending fees that are charged when a plurality of transmission terminals attend a conversation in a transmission management system, which manages transmission of information associated with the conversation between the transmission terminals. The fee management system includes an acquisition unit configured to acquire attending hours information and conversation quality information, the attending hours information indicating attending hours for which each of the transmission terminals has attended the conversation, the conversation quality information indicating conversation communication service quality provided during the conversation; an attending hours computing unit configured to compute total attending hours based on the attending hours information, the total attending hours indicating hours for which the respective terminals have attended the conversation; and an attending fee computing unit configured to compute an attending fee for each of the terminals based on the corresponding total attending hours and the conversation quality information.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

Other objects and further features of the present invention will be apparent from the following detailed description when read in conjunction with the accompanying drawings.

BRIEF DESCRIPTION OF THE DRAWINGS

FIG. 2 is a schematic diagram illustrating a transmitting or receiving status of image data, audio data, and various types of management information in the transmission system;

FIGS. 3A to 3C are schematic diagrams illustrating qualities of the image data;

FIG. 8 is a schematic diagram illustrating a process rule management table;

FIG. 9 is a schematic diagram illustrating raw history information;

FIG. 10A is a schematic diagram illustrating an attendee history management table;

FIG. 10B is a schematic diagram illustrating a conference history management table;

FIG. 12 is a schematic diagram illustrating a user management table;

FIG. 15A is a diagram illustrating an acquisition target period of the process history information;

FIG. 15B is a diagram illustrating search requirements for searching for raw history information;

FIG. 16 is a diagram illustrating an example of a screen displayed on a display of an external input apparatus;

FIG. 18 is a schematic diagram illustrating a summary of attending fees;

FIG. 19A is a schematic diagram illustrating an attendee history management table; and FIG. 19B is a schematic diagram illustrating a conference history management table.

DESCRIPTION OF THE PREFERRED EMBODIMENTS

Figure 1:
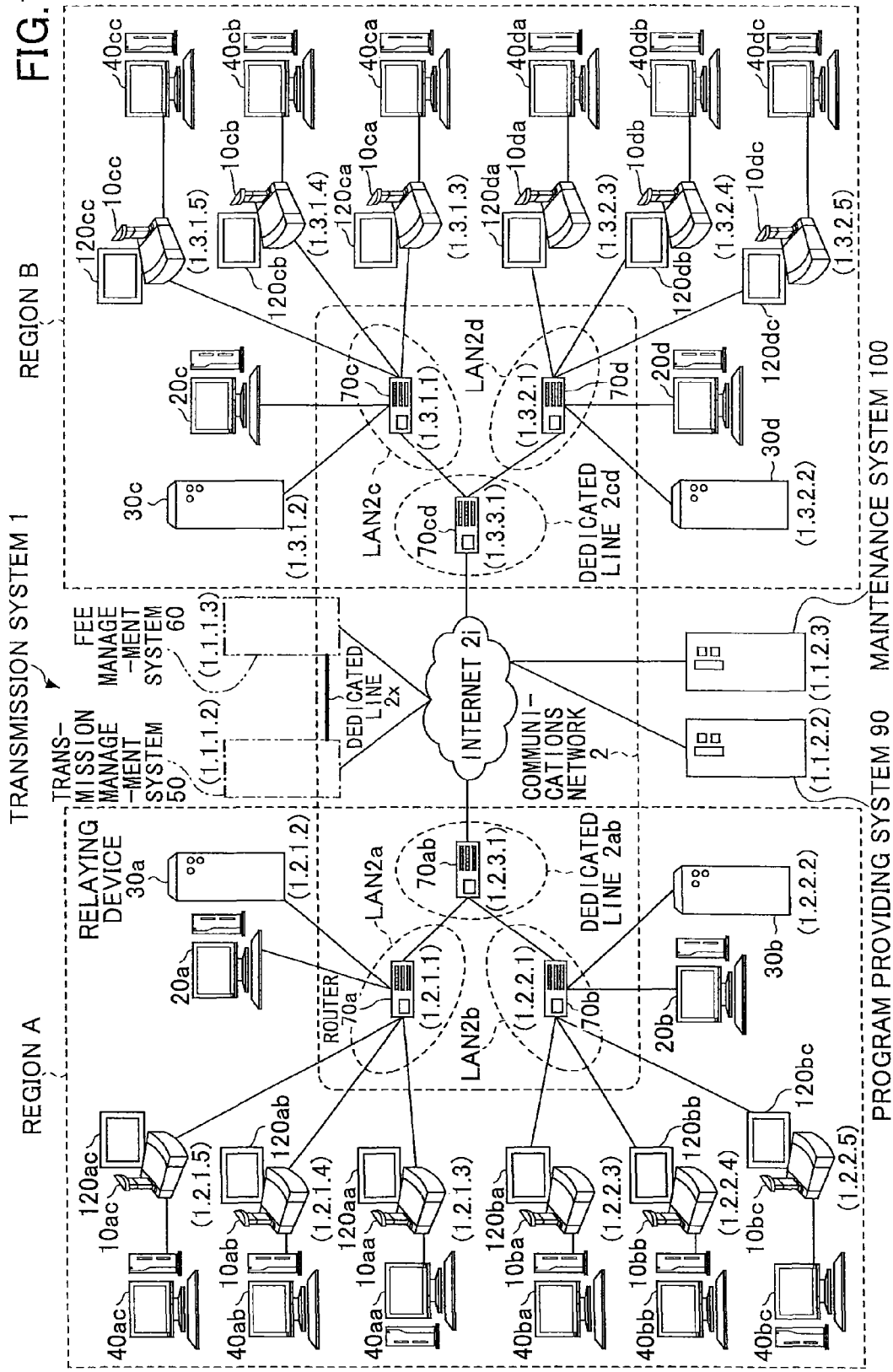
FIG. 1 is a schematic diagram illustrating a transmission system according to an embodiment.

In the following, a description will be given of embodiments with reference to FIGS. 1 to 18. Note that FIG. 1 is a schematic configuration diagram illustrating a transmission system 1 according to an embodiment. The transmission system 1 includes a data providing system configured to transmit content data from a transmission terminal to another transmission terminal via a transmission management system 50, or a communications system configured to mutually transmit information, emotions, or the like between a plural transmission terminals via the transmission management system. The communications system serves as a system for mutually transmitting information, emotions, or the like between plural communications terminals (i.e., the "transmission terminals") via a communications management system (i.e., the "transmission management system"). Examples of such a communications system include a teleconference system, a videophone system, and a mobile phone system.

The present embodiment describes a transmission system, a transmission management system, a transmission terminal, and the like, based on the assumption in which the teleconference system serves as an example of the communications system, the teleconference management system serves as an example of the communications management system, and a teleconference terminal serves as an example of the communications terminal. That is, a transmission terminal and a transmission management system in the present embodiment may not only be applied to the teleconference system but may also be applied to the communications system or the transmission system. Note that in the present embodiment, the term "teleconference" is used; however, the "teleconference" may also be referred to as a "videoconference", as these two terms indicate the same contents and may be used interchangeably.

Overall Configuration of Embodiment

The present embodiment illustrates a case in which users of the transmission system 1 are four offices including a Tokyo office, an Osaka office, a New York office, and a Washington, D.C. office.

In FIG. 1, terminals residing in the inner side of the network from the router 70a are managed by the Tokyo office, terminals residing in the inner side of the network from the router 70b are managed by the Osaka office, terminals residing in the inner side of the network from the router 70c are managed by the New York office, and terminals residing in the inner side of the network from the router 70d are managed by the Washington, D.C. office.

The Tokyo office has plural communicators (attendees) using transmission terminals (10aa, 10ab, 10ac, . . . ) to converse (communicate) with other transmission terminals. The communicators (attendees) may, for example, be employees.

Further, the Tokyo office has a single administrator or plural administrators using user terminals 20a that receive attending fees from a later-described fee management system 60 as well as managing the transmission terminals (10aa, 10ab, 10ac, . . . ). Note that each of the Osaka office, the New York office, and the Washington, D.C. office has plural communicators (attendees) and a single administrator or plural administrators.

Further, in this embodiment, attending fees may be generated by the users of the transmission terminals attending the conversations (e.g., conference) using the transmission system 1 in addition to the communications fees due to the communications between the transmission terminals. The communications fees correspond to packet communications fees charged by an electronic communications company. At present, there is provided a fee plan for unlimited use of packet communications with a predetermined monthly fee. Further, the attending fee may be a total amount of charge when each of the communicators attends conversation with another communicator using the transmission terminals. The attending fee may be charged by the administrator of the transmission system 1 for each of the users. That is, in this embodiment, the attending fee is not necessarily charged per communicator belonging to the user or transmission terminal used by the user.

Further, in this embodiment, it is assumed that the users pay the respective attending fee and communication fees separately. Note that the respective users do not have to be different offices but may be different companies or individuals.

The transmission system 1 illustrated in FIG. 1 includes transmission terminals (10aa, 10ab, . . . ) used by the respective communicators, user terminals (20a, 20b, 20c, and 20d) used by user administrators, displays (120aa, 120ab, . . . ) of the respective transmission terminals (10aa, 10ab, . . . ), external input apparatuses (40aa, 40ab, . . . ) serving as client personal computers (PCs), relay devices (30a, 30b, 30c, and 30d), a transmission management system 50, a fee management system 60, a program providing system 90, and a maintenance system 100. The transmission terminals 10 are configured to transmit image data and audio data when receiving the image data and the audio data as an example of content data.

Note that in the following, any of the transmission terminals (10aa, 10ab, . . . ) may be represented by the "terminal 10", and any of the user terminals (20aa, 20ab, . . . ) may be represented by the "terminal 20". Further, any of the displays (120aa, 120ab, . . . ) may be represented by the "display 120", any of the external input apparatuses (40aa, 40ab, . . . ) may be represented by the "external input apparatus 40", and any of the relay devices (30a, 30b, 30c, and 30d) may be represented by the "relay device 30". In addition, a terminal serving as a request source to request initiation of a teleconference may be represented by a "request source terminal", and a terminal serving as a request destination (relay destination) may be represented by a "destination terminal".

FIG. 2 is a schematic diagram illustrating a transmitting or receiving status of the image data, the audio data, and various types of management information in the transmission system. As illustrated in FIG. 2, in the transmission system 1, a management information session sei for transmitting or receiving various types of management information is established between the request source terminal and the destination terminal via a transmission management system 50. Further, four sessions for transmitting or receiving the respective four data sets including high resolution image data, medium resolution image data, low resolution image data, and the audio data are established between the request source terminal and the destination terminal via the relay device 30. In this example, the four sessions are integrally represented by an image-audio data session sed. Note that image data sessions are not necessarily divided based on resolution levels. Note also that the image data sessions may be less than three or more than three.

Note that a description is given of image resolutions of image data handled in the present embodiment with reference to FIGS. 3A to 3C. FIGS. 3A to 3C are schematic diagrams illustrating qualities of the image data. FIG. 3A illustrates a low resolution image serving as a base image having 160 pixels in a horizontal direction and 120 pixels in a vertical direction. FIG. 3B illustrates a medium resolution image having 320 pixels in a horizontal direction and 240 pixels in a vertical direction. FIG. 3C illustrates a high resolution image having 640 pixels in a horizontal direction and 480 pixels in a vertical direction. Among these, when the image data are relayed via a narrowband route, the low resolution image data formed of low resolution image data alone serving as a base image are relayed. When the image data are relayed via a relatively wideband route, the low resolution image data serving as the base image, and the medium resolution image data formed of medium resolution image data are relayed. Further, when the image data are relayed via a extremely wideband route, the low resolution image data serving as the base image, the medium resolution image data formed of medium resolution image data, and the high resolution image data formed of high resolution image data are relayed. Note also that the image data may be dynamic or static images or a combination of the dynamic and static image data.

The relay device 30 illustrated in FIG. 1 is configured to relay content data between plural terminals 10.

The transmission management system 50 is configured to manage login authentication requested by the terminals 10, call conditions of the terminals 10, a list of addresses (destinations), communication histories, and communications conditions of the relay devices 30 in a unitary manner. Note that a detailed description of the transmission management system 50 will be given later.

The fee management system 60 may be the features of the embodiment of the present invention. The fee management system 60 is configured to compute an attending fee for each user, and manage a fee including the attending fee that is charged to each user. Note that a detailed description of the fee management system 60 will be given later. Alternatively, the fee management system 60 may be configured not only to compute the attending fee but also to calculate a communications fee for each user so as to manage charging of the communications fee to each user.

The routers (70a, 70b, 70c, 70d, 70ab, 70cd) is configured to select the optimal route for transmitting image data and audio data. Note that in the following, any of the routers (70a, 70b, 70c, 70d, 70ab, 70cd) may be represented by the "router 70".

The program providing system 90 includes a later-described hard disk (HD) 204. The HD 204 is configured to store terminal programs to cause the terminal 10 to implement various functions (or allow the terminal 10 to function as various units), and transmit the terminal programs to the terminal 10. Further, the HD 204 of the program providing system 90 is configured to further store relay device programs to cause the relay device 30 to implement various functions (or allow the relay device 30 to function as various units), and transmit the relay device programs to the relay device 30.

Moreover, the HD 204 of the program providing system 90 is configured to further store transmission management programs to cause the transmission management system 50 to implement various functions (or allow the transmission management system 50 to function as various units), and transmit the transmission management programs to the transmission management system 50. Further, the HD 204 of the program providing system 90 is configured to store fee management programs to cause the fee management system 60 to implement various functions (or allow the fee management system 60 to function as various units), and transmit the fee management programs to the fee management system 60.

The maintenance system 100 serves as a computer configured to maintain, manage, and service at least one of the terminal 10, the relay device 30, the transmission management system 50, the fee management system 60, and the program providing system 90. For example, when the maintenance system 100 is domestically installed, and the terminal 10, the relay device 30, the transmission management system 50, the fee management system 60, or the program providing system 90 is installed overseas (internationally), the maintenance system 100 may remotely maintain, manage, and service at least one of the terminal 10, the relay device 30, the transmission management system 50, the fee management system 60, and the program providing system 90 via the communications network 2. Further, the maintenance system 100 is configured to further maintain a model number, a serial number, a sale destination, service, or a failure history of at least one of the terminal 10, the relay device 30, the transmission management system 50, the fee management system 60, and the program providing system 90.

Note that the terminals (10aa, 10ab, . . . ), the relay device 30a, and the router 70a are connected via the LAN 2a such that they communicate with one another. The external input apparatuses (40aa, 40ab, . . . ) are connected to the terminals (10aa, 10ab, . . . ), respectively, such that they communicate with one another. The terminals (10ba, 10bb, . . . ), the relay device 30b, and the router 70b are connected via the LAN 2b such that they communicate with one another. The external input apparatuses (40ba, 40bb, . . . ) are connected to the terminals (10ba, 10bb, . . . ), respectively, such that they communicate with one another. Further, the LAN 2a and LAN 2b are connected to the dedicated line 2ab including the router 70ab such that they communicate with one another within a predetermined region A. For example, the region A may be Japan, and the LAN 2a is installed within the Tokyo office whereas the LAN 2b is installed within Osaka office, as already described above.

On the other hand, the terminals (10ca, 10cb, . . . ), the relay device 30c, and the router 70c are connected via the LAN 2c such that they communicate with one another. The external input apparatuses (40ca, 40cb, . . . ) are connected to the terminals (10ca, 10cb, . . . ), respectively, such that they communicate with one another. The terminals (10da, 10db, . . . ), the relay device 30d, and the router 70d are connected via the LAN 2d such that they communicate with one another. The external input apparatuses (40da, 40db, . . . ) are connected to the terminals (10da, 10db, . . . ), respectively, such that they communicate with one another. Further, the LAN 2c and LAN 2d are connected to the dedicated line 2cd including the router 70cd such that they communicate with each other within a predetermined region B. For example, the region B may be the United States of America (the USA), and the LAN 2c is installed within the New York office whereas the LAN 2d is installed within Washington, D.C. office, as already described above. The region A and the region B are connected such that they communicate with each other from the respective routers (70ab and 70cd) via the Internet 2i. Further, the transmission management system 50 and the fee management system 60 are connected via the dedicated line 2x such that they communicate with each other.

Moreover, the transmission management system 50, the fee management system 60, the program providing system 90, and the maintenance system 100 are connected to the terminal 10 and the relay device 30 via the Internet 2i such that they communicate with one another. The transmission management system 50, the fee management system 60, the program providing system 90, and the maintenance system 100 may be installed in the region A or region B, or may be installed in a region other than regions A and B.

Note that in this embodiment, the communications network 2 is formed of the LAN 2a, the LAN 2b, the dedicated line 2ab, the Internet 2i, the dedicated line 2cd, the dedicated line 2x, the LAN 2c, and the LAN 2d. The communications network 2 not only includes areas where wired communications are performed but also includes areas where wireless communications such as wireless fidelity (WiFi) or Bluetooth (registered trademark) are performed.

Moreover, in FIG. 1, a typical IPv4 address is simply represented by a combination of four digits that is noted beneath each of the terminals 10, the relay devices 30, the transmission management system 50, the fee management system 60, the routers 70, the program providing system 90, and the maintenance system 100. The combination of four digits illustrated beneath the fee management system 60 simply represents the IPv4 address in the communications management server 510. For example, the terminal 10aa is "1.2.1.3". The IPv6 may be used in place of the IPv4; however, the IPv4 alone is employed for simplifying illustration of the embodiments.

Note that each of the terminals 10 may be used not only for communications between plural offices but for communications between different rooms within the same office, communications between individuals within the same room, or communications between those inside the building and those outside the building. When the terminals 10 are used outside the building, wireless communications such as a mobile phone communications network are used.

Hardware Configuration of Embodiment

Initially, a hardware configuration according to an embodiment is described.

Figure 4:
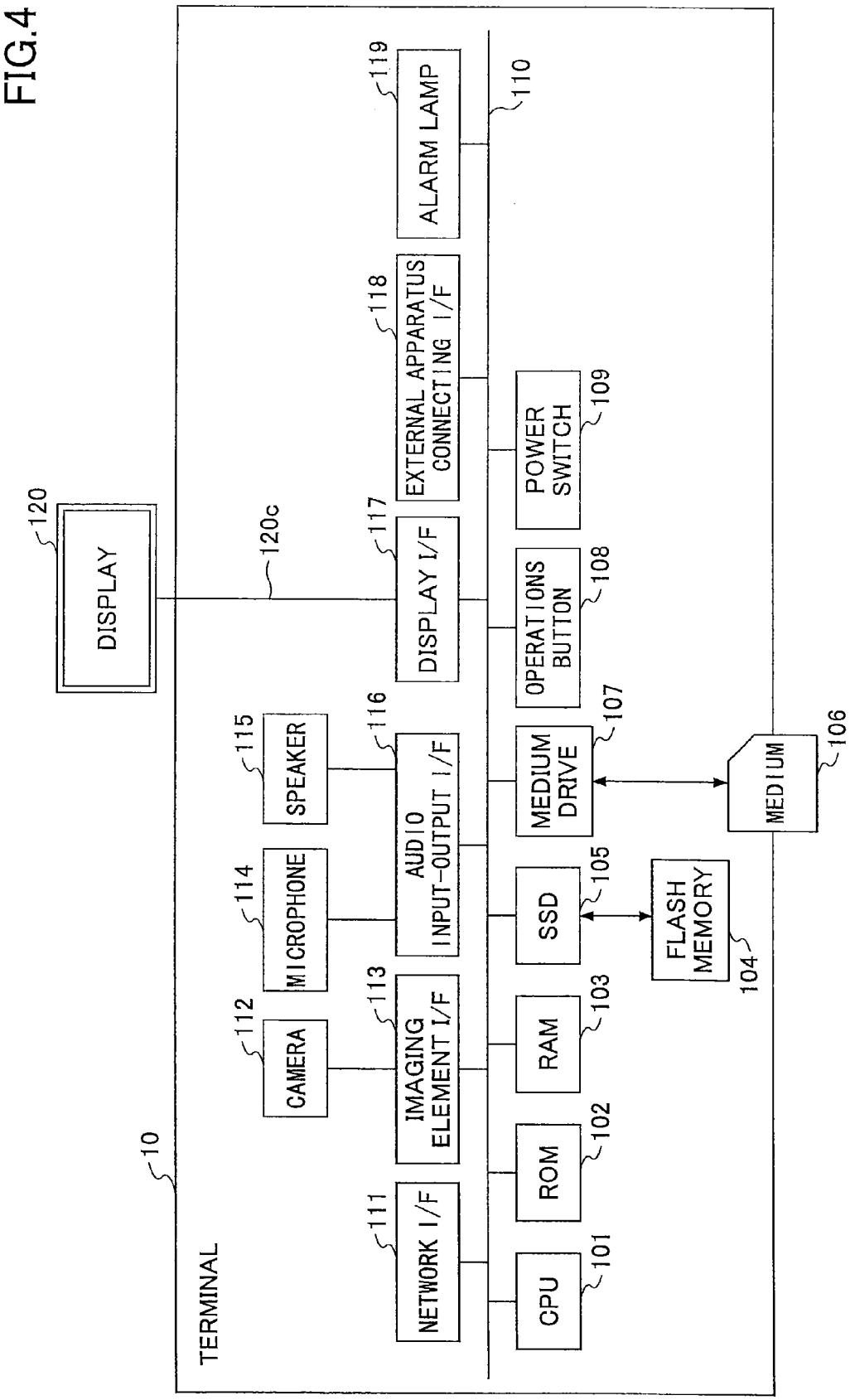
FIG. 4 is a hardware configuration diagram illustrating a transmission terminal according to an embodiment.

FIG. 4 is a hardware configuration diagram illustrating the terminal 10 according to an embodiment. As illustrated in FIG. 4, the terminal 10 of the embodiment includes a central processing unit (CPU) 101 configured to control overall operations of the terminal 10; a read-only memory (ROM) 102 configured to store programs used to drive the CPU 101 such as an initial program loader (IPL); a random access memory (RAM) 103 configured to be used as a work area of the CPU 101; a flash memory 104 configured to store terminal programs, and various types of data including image data and audio data; a solid state drive (SSD) 105 configured to control reading or writing of various types of data with respect to the flash memory 104 under control of the CPU 101; a media drive 107 configured to control reading or wiring (storing) data with respect to a recording medium 106 such as flash memory; an operations button 108 configured to be operated when an address of the terminal 10 is selected; a power switch 109 configured to switch ON or OFF of the power of the terminal 10; and a network interface (I/F) 111 configured to transmit data via the communications network 2.

The terminal 10 is configured to further include a built-in camera 112 configured to image a subject to obtain image data under control of the CPU 101; an imaging element I/F 113 configured to control driving of the camera 112; a microphone 114 configured to input sound and voice; a speaker 115 configured to output sound and voice; an audio input-output I/F 116 configured to process input and output of audio signals between the microphone 114 and the speaker 115 under control of the CPU 101; a display I/F 117 configured to transmit image data to an external display 120 under control of the CPU 101; an external apparatus connecting I/F 118 configured to connect various types of apparatuses; an alarm lamp 119 configured to alert malfunctioning of various types of functions of the terminal 10; and a bus line 110 such as an address bus or a data bus configured to electrically connect the above-described components as illustrated in FIG. 4.

The display 120 serves as a display part composed of liquid crystal or organic electroluminescence (EL) configured to display an image of a subject or operations icons. The display 120 is connected to the display I/F 117 with a cable 120c. The cable 120c may be an analog RGB (video graphics array (VGA)) signal cable, a component video cable, a high-definition multimedia interface (HDMI) cable or a digital video interactive (DVI) signal cable.

The camera 112 includes lenses, and a solid-state imaging element configured to convert light into electric charges to electronically convert an image (video) of a subject. The camera 112 employs a complementary metal oxide semiconductor (CMOS) or a charge coupled device (CCD) as the solid-state imaging element.

The external apparatus connecting I/F 118 may be a universal serial bus (USB) cable or the like inserted in a not-illustrated connecting port of a not-illustrated housing of the terminal 10, via which an external camera, an external microphone, and an external speaker may be electrically connected. When the external camera is connected, the external camera is configured to be driven in priority to the built-in camera 112 under control of the CPU 101. Likewise, when the external microphone or the external speaker is connected, the external microphone or the external speaker is configured to be driven in priority to the built-in microphone 114 or the built-in speaker 115, respectively, under control of the CPU 101.

Note that the recording medium 106 is configured to be removable with respect to the terminal 10. Further, the recording medium 106 is not limited to the flash memory 104, but may be any nonvolatile memory such as an electrically erasable and programmable ROM (EEPROM), from which data are read or on which data are written under control of the CPU 101.

Note that the terminal 10 is only an example, and may be a general-purpose personal computer (PC), a smart phone, a tablet terminal, or a mobile phone. Note also that the camera 112, the microphone 114, and the speaker 115 are not necessarily built-in types, and may be externally connected.

Further, the above-described terminal programs may be recorded as files in an installable format or executable format. The terminal programs may be recorded and distributed in a computer-readable recording medium (e.g., the recording medium 106). Moreover, the terminal programs may be stored in the ROM 102 instead of the flash memory 104.

Figure 5:
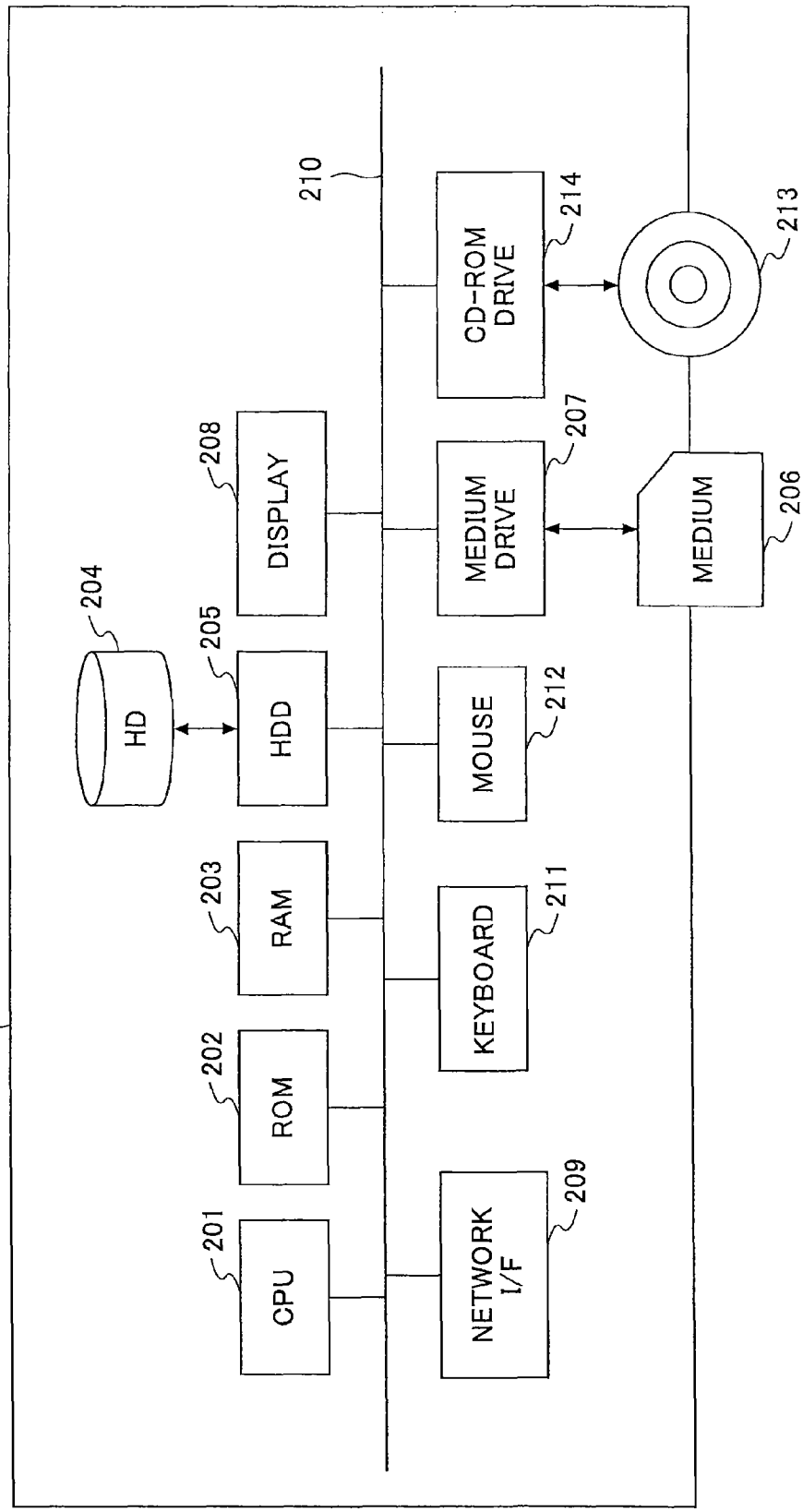
FIG. 5 is a hardware configuration diagram illustrating the transmission terminal according to the embodiment.

FIG. 5 is a hardware configuration diagram illustrating the transmission management system 50 according to an embodiment. The transmission management system 50 includes a central processing unit (CPU) 201 configured to control overall operations of the transmission management system 50; a read-only memory (ROM) 202 configured to store programs used to drive the CPU 201 such as an initial program loader (IPL); a random access memory (RAM) 203 configured to be used as a work area of the CPU 201; a hard disk (HD) 204 configured to store transmission management programs, and various types of data; a hard disk drive (HDD) 205 configured to control reading or writing of various types of data with respect to the HD 204 under control of the CPU 201; a media drive 207 configured to control reading or wiring (storing) data with respect to a recording medium 206 such as flash memory; a display 208 configured to display various types of information such as a cursor, menus, windows, characters, or images; a network interface I/F 209 configured to transmit data via the communications network 2; a keyboard 211 configured to include plural keys for inputting characters, numerical values, various and instructions; a mouse 212 configured to execute various instructions, select a process target, or move the cursor; a CD-ROM drive 214 configured to control reading or writing various types of data with respect to a compact disc read-only memory (CD-ROM) 213 serving as an example of a removable recording medium; and a bus line 210 such as an address bus or a data bus configured to electrically connect the above-described components as illustrated in FIG. 5.

Note that the above-described transmission management programs may be recorded as files in an installable format or executable format. The transmission management programs may be recorded and distributed in a computer-readable recording medium such as the recording medium 206 or the CD-ROM 213. Moreover, the transmission management programs may be stored in the ROM 202 instead of the HD 204.

Further, the relay device 30 has a similar hardware configuration as that of the transmission management system 50, and hence, the description of the hardware configuration of the relay device 30 is omitted from the specification. However, the HD 204 of the relay device 30 records relay device programs configured to control the relay device 30. In this case, the relay device programs may be recorded as files in an installable format or executable format. The relay device programs may be recorded and distributed in a computer-readable recording medium such as the recording medium 206 or the CD-ROM 213. Further, the relay device programs may be stored in the ROM 202 instead of the HD 204.

Further, the external input apparatus 40 has a similar hardware configuration as that of the transmission management system 50, and hence, the description of the hardware configuration of the external input apparatus 40 is omitted from the specification. However, the HD 204 of the external input apparatus 40 records external input apparatus programs configured to control the external input apparatus 40. In this case, the external input apparatus programs may be recorded as files in an installable format or executable format. The external input apparatus programs may be recorded and distributed in a computer-readable recording medium such as the recording medium 206 or the CD-ROM 213. Moreover, the above-described external input apparatus programs may be stored in the ROM 202 instead of the HD 204.

Further, the program providing system 90 has a similar hardware configuration as that of the transmission management system 50, and hence, the description of the hardware configuration of the program providing system 90 is omitted from the specification. However, the HD 204 of the program providing system 90 records program providing programs configured to control the program providing system 90. In this case, the program providing programs may be recorded as files in an installable format or executable format. The program providing programs may be recorded and distributed in a computer-readable recording medium such as the recording medium 206 or the CD-ROM 213. Moreover, the above-described program providing programs may be stored in the ROM 202 instead of the HD 204.

Further, the maintenance system 100 has a similar hardware configuration as that of the transmission management system 50, and hence, the description of the hardware configuration of the maintenance system 100 is omitted from the specification. However, the HD 204 of the maintenance system 100 records maintenance programs configured to control the maintenance system 100. In this case, the maintenance programs may be recorded as files in an installable format or executable format. The maintenance programs may be recorded and distributed in a computer-readable recording medium such as the recording medium 206 or the CD-ROM 213. Further, the maintenance programs may be stored in the ROM 202 instead of the HD 204.

Note that the relay device programs may be recorded and distributed in a computer-readable recording medium such as a compact disc recordable (CD-R), a digital versatile disk (DVD), or a Blu-ray (registered trademark) disc (BD) serving as another example of the removable recording medium.

Functional Configuration of Embodiment

Next, a description is given of the terminal 10, the transmission management system 50, and the fee management system 60 of the embodiment. Note that illustration of functional configurations of the relay device 30, the external input apparatus 10, the router 70, the program providing system 90, and the maintenance system 100 is omitted from the specification.

Transmission Terminal

Figure 6:
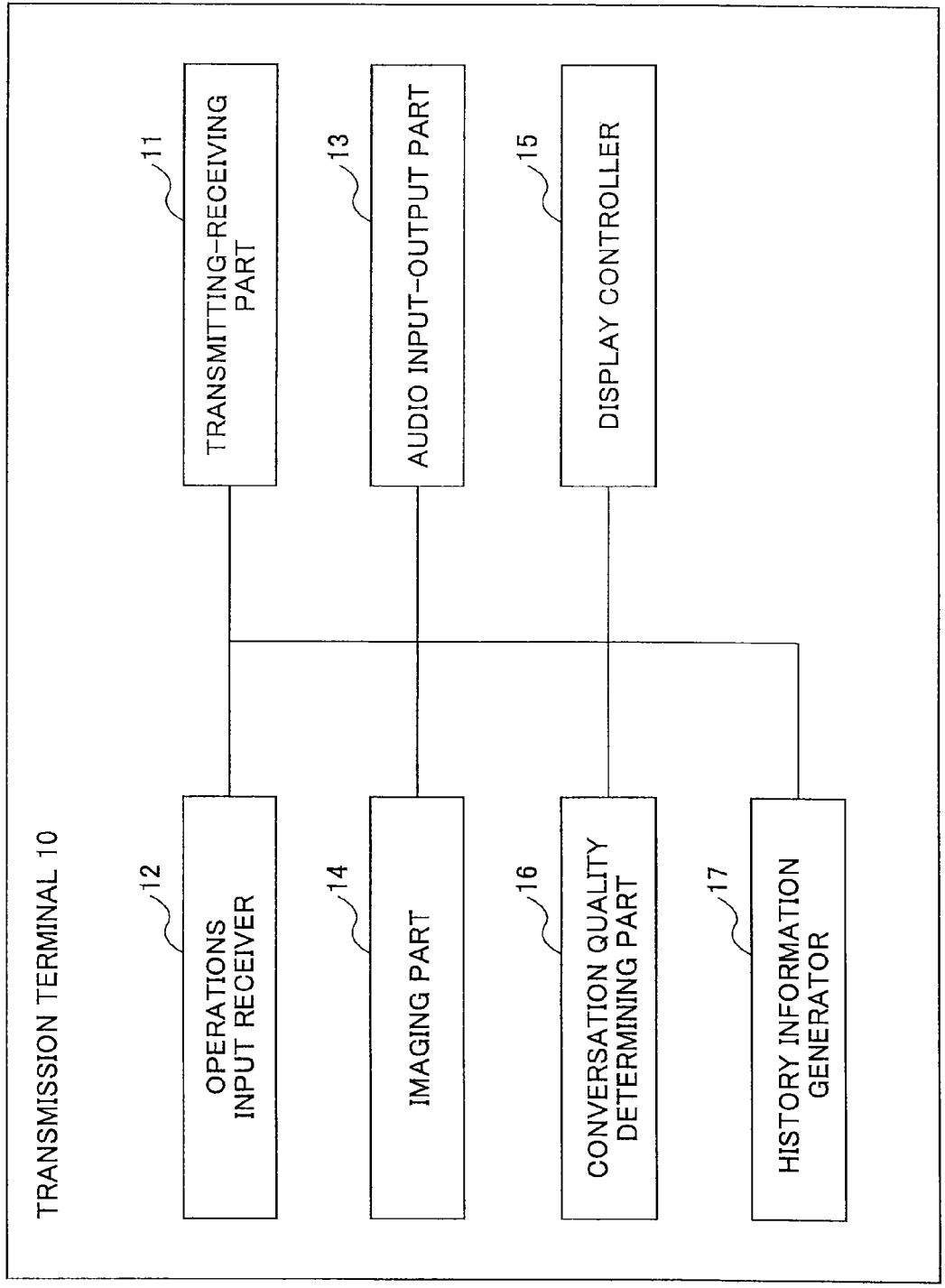
FIG. 6 is a functional block diagram illustrating a terminal according to an embodiment.

FIG. 6 is a functional block diagram illustrating the terminal 10 of an embodiment. As illustrated in FIG. 6, the terminal 10 is configured to include a transmitting-receiving part 11, an operations input receiver 12, an audio input-output part 13, an imaging part 14, an image display controller 15, a conversation quality determining part 16, and a history information generator 17.

The above-described parts may be functions or units to function that may be implemented by causing any of the components illustrated in FIG. 4 to operate based on the instructions from the CPU 101 in compliance with the terminal programs deployed in the RAM 103 from the flash memory 104.

The transmitting-receiving part 11 is implemented by the instructions from the CPU 101 and the network I/F 111 illustrated in FIG. 4, and configured to transmit to and receive from other terminals, apparatuses or systems various data or information via the communications network 2.

The operations input receiver 12 is implemented by instructions from the CPU 101, the operations button 108 and the power switch 109 illustrated in FIG. 4, and configured to receive various types of inputs from a user. For example, when the user switches ON the power switch 109, the operations input receiver 12 receives the user's switching ON operation to switch ON the power of the terminal 10.

The audio input-output part 13 is implemented by the instructions from the CPU 101, and the audio input-output I/F 116 illustrated in FIG. 4. The microphone 114 converts the user's voice into audio signals, and the audio input-output part 13 then inputs audio data associated with the audio signals. Further, the audio input-output part 13 outputs the audio signals associated with the audio data to the speaker 115, and causes the speaker 115 to output the voice.

The imaging part 14 is implemented by instructions from the CPU 101, the camera 112 and the imaging element I/F 113 illustrated in FIG. 4, and configured to image a subject and output the image data of the imaged subject.

The display controller 15 is implemented by instructions from the CPU 101, and the display I/F 117 illustrated in FIG. 4, and configured to control transmission of the image data to be displayed to the display 120.

The conversation quality determining part 16 is configured to determine a conversation quality. The conversation quality indicates a quality of a conversational communications service provided by the transmission system (or the transmission management system 50) while the user is engaged in conversation. Hence, the user having a comfortable conversation indicates that that the user is provided with a high conversation quality, whereas the user having a uncomfortable conversation indicates that that the user is provided with a low conversation quality.

For example, in a case of the communications service employing the Internet network or the mobile phone network, the voice or sound may be interrupted (sound interruption), video images may be skipped (image skipping) in a video conference, or resolution of the video images may be drastically lowered, due to degradation of such networks. As described above, the conversation quality may be affected by transmitting or receiving quality of the audio data and image data. Hence, when the user has a conversation (in a conference) being provided with high resolution video images without sound interruption and image skipping, the conversation quality determining part 16 determines that the user is provided with a high conversation quality. On the other hand, when the user has a conversation (in a conference) being provided with low resolution video images with sound interruption and image skipping, the conversation quality determining part 16 determines that the user is provided with a low conversation quality.

Note that the conversation quality may be represented by scores, numerical values, ranking evaluation (e.g., A, B, and C), or the like based on a predetermined standard. Alternatively, the conversation quality may, for example, be represented by percentage computed as follows. That is, the mean resolution (640×480=307200 dots) received by the terminal 10 during conversation may be divided by a standard resolution (640×480) determined by the service. Further, the conversation quality may, for example, be represented by the transmitted mean resolution or the mean received frame rate. Moreover, the conversation quality may, for example, be represented by the number of observations of sound interruption or image skipping, or a compound value computed based on the observations of the sound interruption or image skipping. In this embodiment, the scores from 0 to 100 may be employed for simplifying the description.

The history information generator 17 is configured to generate history information (log information) associated with a communications status of each of the terminals 10. The generated history information may be transmitted to the transmission management system 50 when the communication status is changed. Note that the transmitted history information corresponds to the raw history information illustrated in FIG. 9.

Note that the generated history information includes conversation quality values (e.g., scores). Note that the conversation quality indicates a quality of conversation in communications every time the communications implementing a conference are completed. Hence, the conversation quality value is determined when the communications status indicates the end of the conference (e.g., when the communications status is "leave" or "offline"), and the determined conversation quality value is input into a "conversation quality" field within the history information.

Transmission Management System

Figure 7:
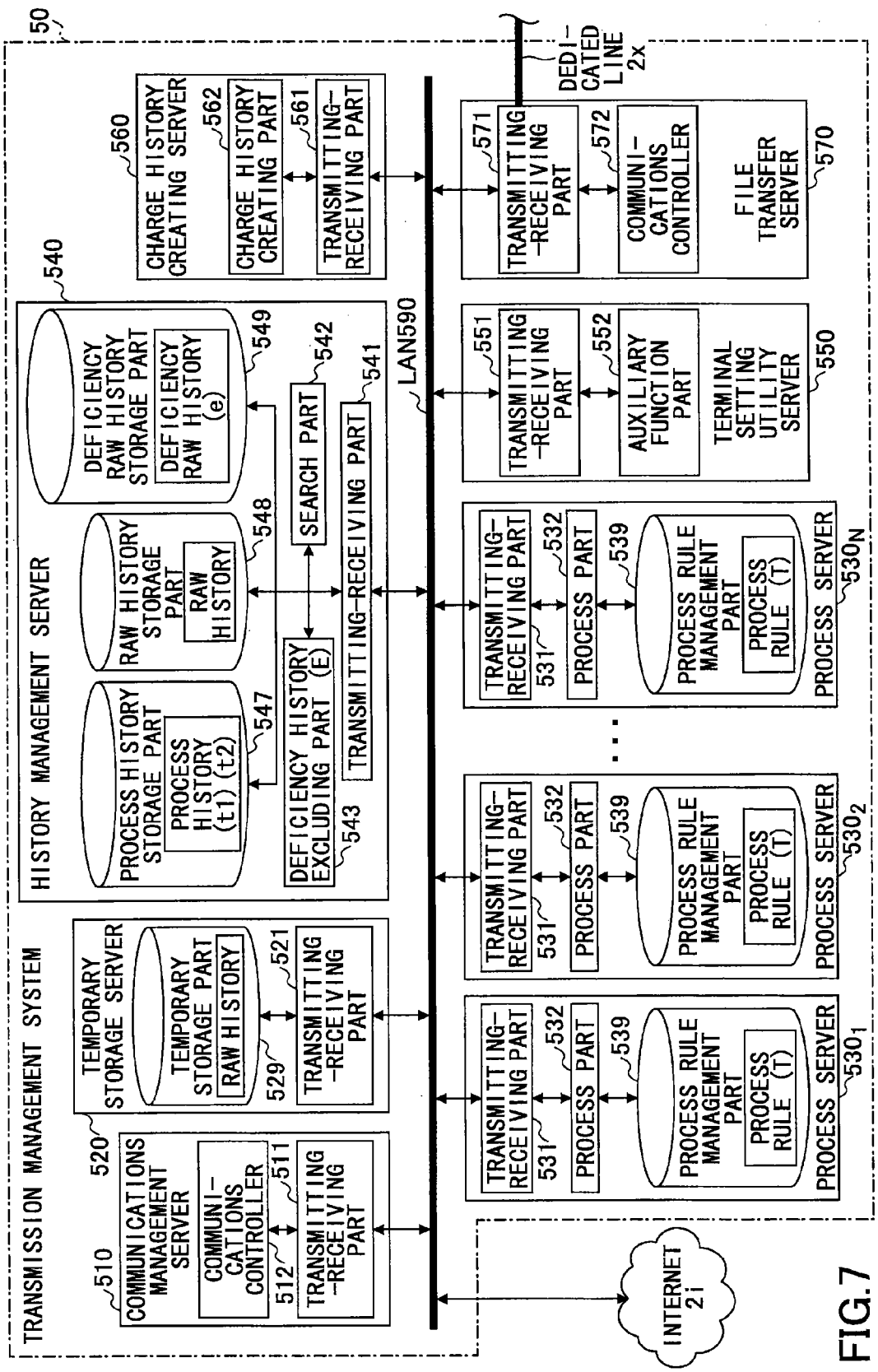
FIG. 7 is a functional block diagram illustrating a management system according to an embodiment.

FIG. 7 is a functional block diagram illustrating the transmission management system 50 of an embodiment. As illustrated in FIG. 7, the transmission management system 50 includes a communications management server 510; a temporary storage server 520; plural process servers (5301, 5302, . . . , 530N) (N represents an integer); a history information management server 540; a terminal setting utility server 550; a charge history creating server 560; and a file transfer server 570. The above-described servers are connected to one another via a LAN 590 such that the servers communicate with one another, while the servers are connected to the Internet 2i via the LAN 590.

Note that each of the servers forming the transmission management system 50 has a similar hardware configuration as that of the transmission management system 50, and hence, the description of the hardware configurations of the servers is omitted from the specification. Further, any of the process servers (5301, 5302, . . . , 530N) may be represented by the "process server 530". Further, the file transfer server 570 is also connected to the dedicated line 2x.

Communications Management Server

Subsequently, a description is given of featured functions of the communications management server 510. The communications management server 510 is configured to include a transmitting-receiving part 511, and a communications controller 512.

The transmitting-receiving part 511 is a function or a unit that may be implemented by instructions from the CPU 201, and the network I/F 209 illustrated in FIG. 5. The transmitting-receiving part 511 is configured to transmit to and receive from other terminals, apparatuses or systems various data or information via the communications network 2 including the LAN 590, and the Internet 2i. For example, the transmitting-receiving part 511 may receive raw history information indicating a history associated with communications performed in each of the terminals 10 from the corresponding terminal 10 via the Internet 2i and the LAN 590.

Note that the raw history information is information indicating a history (log) associated with the communications status of each of the terminals 10. That is, the raw history information is raw information before a later-described process is being performed. FIG. 9 illustrates an example of a raw history information group. Each of the raw history information items is represented per schema record illustrated in FIG. 9. Each of the raw history information items is formed of attributes including a communications status, a request source terminal ID, a destination terminal ID, a session IF, a conference ID, a conference session ID, communications date and time, and a conversation quality.

Among these attributes, the attribute "communications status" represents one of types of the communications contents of the terminal 10. Further, among these communication statuses, the communications status "online" represents an ON status of the power of the terminal 10. The communications status "offline" represents an OFF status of the power of the terminal 10. Note that when the communications status is switched to "offline" during the conference, respective values are stored in the fields of the conference ID and the conference session ID. The communications status "invite" represents an invitation request for being invited to the conference. The communications status "call" represents an attending request for attending the conference being held. The communications status "accept" represents a permission to the invitation request (invite) or the attending request (call). The communications status "start" represents an initiation of the conference. The communications status "end" represents an end of the conference. The communications status "join" represents the terminal 10 attending the conference. The communications status "leave" represents the terminal 10 exiting from the conference.

Further, the attribute "request source terminal ID" represents identification (ID) for identifying the request source terminal as an example of request source terminal identification information. Moreover, the attribute "destination terminal ID" represents identification (ID) for identifying the destination terminal as an example of destination terminal identification information. Moreover, the attribute "session ID" represents identification (ID) for identifying a session from online to offline. Further, the attribute "conference ID" represents identification (ID) for identifying a conference. Moreover, the attribute "conference session ID" represents identification (ID) for identifying a conference session from the terminal 10 attending the conference to the terminal 10 exiting from the conference. For example, when the terminal 10 attends the same conference or exits from the same conference two or more times with time intervals, the conference session ID has a difference value each time the terminal 10 attends the conference or exits from the same conference. Further, the attribute "communications date and time" represent date and time of communications performed by the terminal 10 with the above-described communications statuses.

The attribute "conversation quality" indicates degrees of quality of the conversation held in the conference communications when the conference utilizing the terminal 10 has completed. In this embodiment, the "conversation quality" is evaluated by the scores from 0 to 100. For example, when the "conversation quality" is a score of 100, audio data and image data communications are provided with the highest communications status during the conference, which indicates that the highest quality conversation is provided in the conference communications.

Note that the above-described attributes and the communications statuses are only examples, and may include other data items and values. Further, in this example, each of the attributes is clearly defined such as a database (DB) table. However, the raw history information may include various items, and hence, the raw history information may be configured to include text data items alone such as JavaScript Object Notation (JSON), and extensible markup language (XML).

The display controller 512 is a function or a unit that may be implemented by instructions from the CPU 201 illustrated in FIG. 5, and configured to perform control in association with communications executed between the transmitting-receiving part 511 and each of the terminals 10 based on the management information session sei illustrated in FIG. 2. For example, the communications controller 512 performs management of the communications with each of the terminals, control and management for receiving the raw history information from each of the terminals 10, and control and management for transmitting later described process history information to the terminal 10 that has requested acquiring the process history information. Note that the terminal 10 that has requested acquiring the process history information is referred to as the "acquisition request source terminal".

Temporary Storage Server

Next, a description is given of featured functions of the temporary storage server 520. The temporary storage server 520 is configured to include a transmitting-receiving part 521, and a temporary storage part 529.

The transmitting-receiving part 521 is a function or a unit that may be implemented by instructions from the CPU 201, and the network I/F 209 illustrated in FIG. 5. The transmitting-receiving part 521 is configured to transmit to or receive from other servers various types of data (or information) via the LAN 590. For example, the transmitting-receiving part 521 may receive raw history information indicating a history associated with communications in each of the terminals 10 from the transmitting-receiving part 521 of the communications management server 510 via the LAN 590.

Further, the transmitting-receiving part 521 transmits raw history information stored in the temporary storage part 529 to the process server 530 via the LAN 590. The transmitting-receiving part 521 receives the raw history information returned from the process server 530.

Further, the temporary storage part 529 is composed of the HD 204 and the HDD 205 illustrated in FIG. 5. The temporary storage part 529 is configured to temporarily store the raw history information received by the transmitting-receiving part 511, and read the already stored raw history information to the transmitting-receiving part.

Process Server

Next, a description is given of featured functions of the process server 530. FIG. 8 is a schematic diagram illustrating a process rule management table. FIG. 9 is a schematic diagram illustrating raw history information. FIG. 10A is a schematic diagram illustrating an attendee history management table. FIG. 10B is a schematic diagram illustrating a conference history management table. In the present embodiment, the temporary storage server 520 and the process server 530 are separately constructed, which enables the transmission management system 50 to receive the raw history information until the end of a process carried out by the process server 530. Further, there are plural process servers 530 in the transmission management system 50. Hence, plural sets of the raw history information may be distributed to these process servers 530 to separately process the respective sets of the raw history information, which may distribute the process load between these process servers 530.

The process server 530 is configured to include a transmitting-receiving part 531, a process part 532, and a process rule management part 539. The transmitting-receiving part 531 is a function or a unit that may be implemented by instructions from the CPU 201, and the network I/F 209 illustrated in FIG. 5.

The transmitting-receiving part 531 is configured to transmit to or receive from other servers various types of data (or information) via the LAN 590.

The process rule management part 539 is composed of the HD 204 and the HDD 205 illustrated in FIG. 5. The process rule management part 539 is composed of a process rule management table (T) in which communications status information indicating a communication status of a predetermined terminal 10 is associated with process contents information indicating the contents of the process. The process rule management table (T) is configured to include the attributes (fields) including a process start requirement, a post-process target table, a post-process target record, and process contents as illustrated in FIG. 8.

The attribute "process start requirement" indicates a requirement for the process part to start processing based on the process contents. The process start requirement may differ based on the "communications status", the "conference ID", and the "conference session ID".

The attribute "post-process target table" indicates one of the post-process tables (t1, and t2) illustrated in FIGS. 10A and 10B. The attribute "post-process target record" indicates a predetermined one of records of the post-process tables (t1, and t2) illustrated in FIGS. 10A and 10B.

Further, the attribute "process contents" indicates contents of a process in which the process part 532 performs a process on the raw history information to form process history information by associating a specific one of items of the raw history information with a corresponding one of items of the process history information.

Note that when there is no post-process target record in the process rule management table (T), the process part 532 newly creates records corresponding to the post-process tables (t1, and t2).

Further, when values are already entered in all the items subject to processing at the time of performing the process, the process part 532 does not perform any process. When no process start requirement (communication status) is applicable, the process part 532 does not perform any process. When values are not entered in the start date and time or the end date and time of any terminal 10 in the raw history information at the time of updating the conference hours, the process part 532 does not perform any process. When values are not entered in the attending date and time or the exit date and time of any terminal 10 in the raw history information at the time of updating the attending hours, the process part 532 does not perform any process.

Note that the above-described process rule is only an example, and a process rule differing from the above-described process rule may be defined. Alternatively, the process rule may be defined by a program representing the process rule without using the process rule management table (T) so that the process is performed based on the process rule program.

The process part 532 is a function or a unit that may be implemented by instructions from the CPU 201 illustrated in FIG. 5, and configured to perform various types of processes such as creating process history information indicating a post-process history by carrying out a predetermined process with respect to the raw history information.

As an example of various types of processes, the process part 532 may determine whether raw history information is stored in the temporary storage part 529 via the transmitting-receiving part 531, the LAN 590, and the transmitting-receiving part 521. Further, the process part 532 searches the process rule management table (T) for communication status information indicating the communication status contained in the raw history information received by the transmitting-receiving part 531 as a search key to extract a corresponding process information. Further, the process part 532 performs a process on the received raw history information in compliance with the process contents indicated by the extracted process information to create process history information indicating a post-process history.

The process part 532 stores the process history information create by the process part 532 in the process history part 547 of the later-described history management server 540 via the transmitting-receiving part 531 and the LAN 590. Further, the process part 532 stores the raw history information in a raw history part 548 of the history management server 540 via the transmitting-receiving part 531, and the LAN 590, regardless of the raw history information being processed or unprocessed. However, when the process history storage part 547 and the raw history storage part 548 fail to store the process history information, the process part 532 returns the raw history information before being processed to the temporary storage part 529 of the temporary storage server 520 via the transmitting-receiving part 531, the LAN 590, and the transmitting-receiving part 521.

When the raw history information has deficiency (e) due to missing information of the predetermined item of the raw history information, and the process part 532 fails to perform process on the raw history information, the process part 532 stores the raw history information having the deficiency (e) in a deficiency raw history storage part 549 of the history management server 540 via the transmitting-receiving part 531 and the LAN 590.

History Management Server

Next, a description is given of featured functions of a history management server 540. The history management server 540 is configured to include a transmitting-receiving part 541, a search part 542, a deficiency history excluding part 543, a process history storage part 547, the raw history storage part 548, and the deficiency raw history storage part 549.

The transmitting-receiving part 541 is a function or a unit that may be implemented by instructions from the CPU 201, and the network I/F 209 illustrated in FIG. 5. The transmitting-receiving part 541 is configured to transmit to or receive from other servers various types of data (or information) via the LAN 590.

The search part 542 searches the process history storage part 547 for the process history information corresponding to the acquisition request, and extracts the process history information corresponding to the acquisition request.

The deficiency history excluding part 543 is a function or a unit that may be implemented by instructions from the CPU 201 illustrated in FIG. 5. When the deficiency history excluding part 543 receives an acquisition request for acquiring the process history information from the external input apparatus 40 connected to the acquisition request source terminal, the deficiency history excluding part 543 checks whether there is deficiency (E) due to missing information of the predetermined items in each of the acquisition requested process history information sets stored in the process history storage part 547. When the deficiency history excluding part 543 detects the deficiency (E) in the process history information, the deficiency history excluding part 543 excludes such process history information having the deficiency (E).

Note that when the temporary storage part 529 stores the raw history information in the order of sequential receipt from the terminals 10, the process history information will not have deficiency (E). However, an asynchronous process of the temporary storage part 529 may disturb the temporary storage part 529 from storing the raw history information in the order of sequential receipt from the terminals 10. As a result, the raw history information is not necessarily stored in the order of sequential transmission from each of the terminals 10. Further, as illustrated in this embodiment, when there are process servers 530, even though the raw history information transmitted from each of the terminals 10 is sequentially stored in the temporary storage part 529 in the transmitted order, the process is not necessarily performed on the raw history information in the order of being transmitted from the terminals 10. Thus, the process history information having deficiency (E) may be provided owing to the timing of acquisition requests from the acquisition request source terminal. Hence, the deficiency history excluding part 543 of the embodiment is configured to check whether the process history information has deficiency (E) in advance before providing the acquisition request source terminal with the process history information.

Next, the process history storage part 547 stores the process history information created by the process part 532 of each of the process servers 530. The process history information is, as illustrated in FIG. 10A, managed as the attendee history management table (t1), and is also, as illustrated in FIG. 10B, the conference history management table (t2).

The attendee history management table (t1) is, as illustrated in FIG. 10A, configured to include attributes including a history ID, a terminal ID, a conference ID, a conference session ID, attending date and time, exit date and time, attending hours, an exit status, and a conversation quality. Among these attributes, the attribute "history ID" represents identification (ID) for specifically identifying an attendee at a conference. The attribute "terminal ID" represents identification (ID) for specifically identifying a terminal attending the conference as an example of terminal identification information. The attribute "conference ID" represents identification (ID) for specifically identifying a conference which the attendee or the terminal 10 has attended.

Further, the attribute "conference session ID" represents identification (ID) for specifically identifying a conference session seim serving as an example of session sei from the terminal 10 attending (join) the conference to the terminal 10 exiting (leave) from the conference. For example, when a certain terminal 10 repeatedly attends the same conference or exits from the same conference two or more times with time intervals, the conference session ID has a difference value each time the terminal 10 attends the same conference or exits from the same conference.

Further, the attribute "attending date and time" represents date and time at which the terminal 10 has attended the conference. The attribute "exit date and time" represents date and time at which the terminal 10 has exited from the conference. The attribute "attending hours" represents a period of time (hours) from the time at which the terminal 10 has attended the conference to the time at which the terminal 10 has exited from the conference.

The attribute the "conversation quality" represents degrees of a conversation quality in the corresponding conference communications at the time where the terminal 10 has completed the conference.

Further, the attribute "exit status" represents a status in which the terminal 10 has exited from the conference. The exit status "exit" indicates a status in which the terminal 10 has normally exited from the conference. The exit status "forced termination" indicates a status in which the terminal 10 has forcibly been terminated due to power off. The exit status "conference in progress" indicates a status in which the terminal 10 is currently attending the conference.

Note that the above-described attributes and the exit statuses of the attendee history management table (t1) are only examples, and may include other data items and values.

Next, the conference history management table (t2) is, as illustrated in FIG. 10B, configured to include attributes including a conference ID, an organizer terminal ID, start date and time, end date and time, and conference hours. Among these attributes, the attribute "conference ID" represents identification (ID) for specifically identifying a conference. The attribute "organizer terminal ID" represents identification (ID) for specifically identifying a terminal serving as an organizer of the conference. For example, the organizer of the conference represents an organizer of a conference which three attendees are expected to attend. One of the attendees may attend or exit from the conference immediately after the conference has started. The above attendee's attending or exiting from the conference is indicated in the attendee history management table (t1).

Further, the attribute "start date and time" represents date and time at which an entire conference has started. The attribute status "end date and time" represents date and time at which the entire conference has ended. The attribute status "conference hours" represents a period of time (hours) in which the entire conference has been held.

Note that the above-described attributes of the conference history management table (t2) are only examples, and may include other data items and values.

Further, in the present embodiment, one of the process history storage parts 547 may store the above-described two tables (t1 and t2). However, the present embodiment is not limited to such a configuration, and a database (DB) may be constructed corresponding to each of the two tables (t1 and t2).

Next, referring back to FIG. 7, the raw history storage part 548 stores the raw history information stored in the temporary storage part 529 as it is for a long-term storage as master data. Hence, the raw history information stored as the master data may be able to use when any failure has occurred in the transmission system 1.

When the raw history information has deficiency (e) due to missing information of the predetermined item of the raw history information, and the process part 549 fails to perform process on the raw history information, the deficiency raw history storage part 549 stores the raw history information having the deficiency (e).

Terminal Setting Utility Server

Next, a description is given of featured functions of the terminal setting utility server 550. The terminal setting utility server 550 represents a server that receives an acquisition request for acquiring the process history information from the acquisition request source terminal and transmits the process history information to the terminal 10. The terminal setting utility server 550 is configured to include a transmitting-receiving part 551, and an auxiliary function part 552.

The transmitting-receiving part 551 is a function or a unit that may be implemented by instructions from the CPU 201, and the network I/F 209 illustrated in FIG. 5. The transmitting-receiving part 551 serves as an interface for receiving an acquisition request for acquiring the process history information from the acquisition request source terminal and transmitting the process history information to the acquisition request source terminal. The auxiliary function part 552 is a function or a unit that may be implemented by instructions from the CPU 201 illustrated in FIG. 5. The auxiliary function part 552 is configured to execute various types of auxiliary functions excluding functions such as the acquisition of the raw history data or communications control.

Charge History Creating Server

Next, a description is given of featured functions of the charge history creating server 560. The charge history creating server 560 is configured to create a charge history for charging a user a usage fee for his/her using the transmission system 1. The charge history creating server 560 is configured to include a transmitting-receiving part 561, and a charge history creating part 562.

The transmitting-receiving part 561 is a function or a unit that may be implemented by instructions from the CPU 201, and the network I/F 209 illustrated in FIG. 5. The transmitting-receiving part 561 is configured to request the history management server 540 to acquire attending hours information (pi) and conversation quality information (si) via the LAN 590. The attending hours information (pi) indicates the "attending hours" in a predetermined period indicated by the "attending date and time" and the "exit date and time" (e.g., a period from Sep. 1, 2010 to Sep. 30, 2010). The conversation quality information (si) indicates the "conversation quality".

Further, the transmitting-receiving part 561 is configured to acquire desired attending hours information (pi) and conversation quality information (si) from the history management server 540. In addition, the transmitting-receiving part 561 is configured to transmit later-described charge history information (i) created by the charge history creating part 562 to the file transfer server 570.

The charge history creating part 562 is a function or a unit that may be implemented by instructions from the CPU 201 illustrated in FIG. 5. The charge history creating part 562 is configured to create charge history information (i) formed of a comma separated values (CSV) file based on the attending hours information (pi), and the conversation quality information (si) acquired by the transmitting-receiving part 561.

File Transfer Server

Next, a description is given of featured functions of the file transfer server 570. The file transfer server 570 is connected to a later-described file transfer server 610 in the fee management system 60 via the dedicated line 2x. Hence, the transmission management system 50 may be able to transfer an electronic file to the fee management system 60 via the dedicated line 2x without passing through the Internet 2i, which may prevent fees from being tampered with.

The file transfer server 570 is configured to include a transmitting-receiving part 571, and a communications controller 572. The transmitting-receiving part 571 is a function or a unit that may be implemented by instructions from the CPU 201, and the network I/F 209 illustrated in FIG. 5. The transmitting-receiving part 571 is configured to receive the charge history information (i) including the attending hours information (pi) and the conversation quality information (si) transmitted from the charge history creating server 560, and transfer the charge history information (i) to the later-described file transfer server 610 in the fee management system 60 via the dedicated line 2x. Further, the communications controller 572 is a function or a unit that may be implemented by instructions from the CPU 201 illustrated in FIG. 5, and configured to control information (data) transmission and reception of the transmitting-receiving part 571.

Fee Management System

Figure 11:
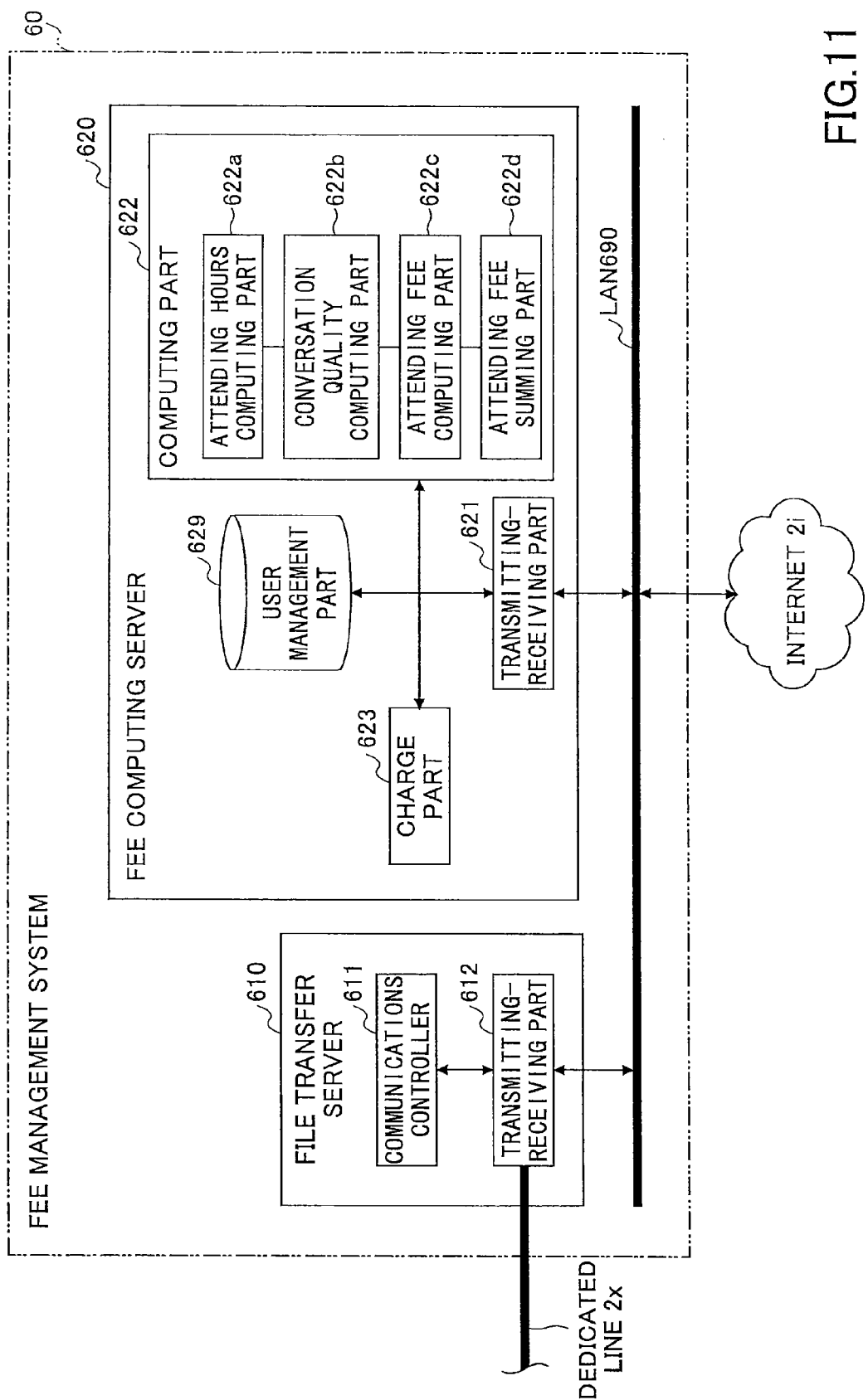
FIG. 11 is a functional block diagram illustrating a fee management system serving as a featured part of an embodiment.

FIG. 11 is a functional block diagram illustrating a fee management system 60 of an embodiment. As illustrated in FIG. 11, the fee management system 60 includes the file transfer server 610, and the fee computing server 620. The above-described servers are connected to each other via the LAN 690 such that the servers communicate with each other while the servers are connected to the Internet 2i via the LAN 690. Further, the file transfer server 610 is also connected to the dedicated line 2x. Note that each of the servers forming the fee management system 60 has a similar hardware configuration as that of the transmission management system 50, and hence, the description of the hardware configurations of the servers is omitted from the specification.

File Transfer Server

Next, a description is given of featured functions of the file transfer server 610. The file transfer server 610 is connected to the file transfer server 570 in the transmission management system 50 via the dedicated line 2x. Hence, the fee management system 60 may be able to receive an electronic file from the transmission management system 50 via the dedicated line 2x without being passed through the Internet 2i.

The file transfer server 610 is configured to include a transmitting-receiving part 612, and a communications controller 611. The transmitting-receiving part 612 is a function or a unit that may be implemented by instructions from the CPU 201, and the network I/F 209 illustrated in FIG. 5. The transmitting-receiving part 612 is configured to receive the charge history information (i) transmitted as an electronic file from the file transfer server 570 of the transmission management system 50 via the dedicated line 2x, and transfer the charge history information (i) to the fee computing server 620 via the LAN 690. Further, the communications controller 611 is a function or a unit that may be implemented by instructions from the CPU 201 illustrated in FIG. 5, and configured to control information (data) transmission and reception of the transmitting-receiving part 612.

Fee Computing Server

Next, a description is given of featured functions of the fee computing server 620. The fee computing server 620 is configured to include a transmitting-receiving part 621, a computing part 622, a charge part 623, and a user management part 629.

The user management part 629 is composed of the HD 204 and the HDD 205 illustrated in FIG. 5. The user management part 629 is formed of a user management table (Ty). The user management table (Ty) is configured to include attributes (fields) including a contract number of a user, a user ID, a user name, a user address, a user phone number, a user email address, and a terminal ID that are associated with one another as illustrated in FIG. 12. Note that the contract number of the user, the user ID, the user name, the user address, the user phone number, and the user email address may be used alone or a combination of two or more as user identification information for identifying the user.

The attribute "contract number" is an identification number of a contract when the contract is exchanged between the administrator of the transmission system 1 and each of the users in order for each user to use the transmission system 1.

The attribute "user ID" represents user identification information composed of an identifier and the like for specifically identifying a user.

The attribute "user name" represents information indicating a title or a name of a user. The attribute "user address" represents information indicating an address or a residence of a user, an example of which may be an installation site of the terminal 20.

The attribute "user phone number" represents information indicating a phone number of a user. The attribute "user mail address" represents information indicating an electronic mail address of the terminal 20.

The attribute "terminal ID" is an example of terminal identification information, which represents information indicating terminal identification (ID) of all the terminals 10 held by the user for specifically identifying a terminal attending the conference as an example of terminal identification information. For example, the user having the user ID "a123" has the terminals 10 represented by the terminal IDs "11001", "11002", "11003", and the like.

Further, the transmitting-receiving part 621 is a function or a unit that may be implemented by instructions from the CPU 201, and the network I/F 209 illustrated in FIG. 5. The transmitting-receiving part 621 is configured to transmit to or receive from other terminals or systems various types of data (or information) via the Internet 2i and the communications network 2.

The computing part 622 is a function or a unit that may be implemented by instructions from the CPU 201, and the network I/F 209 illustrated in FIG. 5. The computing part 622 is configured to compute a total attending fee for each of the users based on the charge history information (i) transferred from the file transfer server 610. Further, the computing part 622 is configured to include an attending hours computing part 622a, a conversation quality computing part 622b, an attending fee computing part 622c, and an attending fee summing part 622d.

The attending hours computing part 622a is configured to refer to the attending history management table (t1) (see FIG. 10A) stored in the process history storage part 547 of the transmission management system 50, and compute a total attending hours for each of the terminals 10 within a predetermined period by summing up the attending hours values represented by the "attending hours" of a corresponding one of the terminal IDs within the predetermined period.

For example, in FIG. 10A, the terminal ID "110001" is managed by the history IDs "001", and "005" within a predetermined period (e.g., a whole month of September, 2010) illustrated in FIG. 15A. Hence, the total attending hours of the terminal 10 represented by the terminal ID "110001" may be computed by summing the attending hours "1 hr 30 min 25 s (01:30:25)", "1 hr 10 min 10 s (01:10:10)", and the like, respectively.

Further, the conversation quality computing part 622b is configured to refer to the attending history management table (t1) (see FIG. 10A) stored in the process history storage part 547 of the transmission management system 50, and acquire a conversation quality value for each of the terminals 10 within a predetermined period. The conversation quality computing part 622b is configured to further compute the average of the conversation quality values per unit time as an average conversation quality per unit time within the predetermined period. Note that the unit time is determined as "minute".

For example, in FIG. 10A, the terminal ID "110001" is managed by the history IDs "001", and "005" within a predetermined period (e.g., a whole month of September, 2010) illustrated in FIG. 15A. Among these, the conversation quality and the attending hours corresponding to the history ID "001" are "100" and "1 hr 30 min 25 s (01:30:25)" (approximately 90 m), respectively. Similarly, the conversation quality and the attending hours corresponding to the history ID "005" are "100" and "1 hr 10 min 10 s (01:10:10)" (approximately 70 m), respectively. In this case, the average conversation quality value per unit time is computed as $\{(90 \times 100)+(70 \times 80)\}/(90+70)=91.25$.

Further, the attending fee computing part 622c is configured to compute an attending fee for each of the terminals 10 within the predetermined period based on the total attending hours computed by the attending hours computing part 622a and the average conversation quality per unit time computed by the conversation quality computing part 622b.

For example, there is a case where the administrator determines an attending fee per minute being ten yen in advance. In this case, when the total attending hours of any one of the terminals 10 computed by the attending hours computing part 622a is 160 min, and the average conversation quality per unit time is 91, the attending fee may be computed as follows: $10 \times 160 \times 0.91=1456$ yen. Note that the conversation quality in this embodiment is evaluated by the scores from 0 to 100. Hence, when the average conversation quality value per unit time is 91, the ratio coefficient 0.91 is あ multiplier. When the average conversation quality value per unit time is 100, the ratio coefficient 1 is a multiplier.

Further, the attending fee summing part 622d refers to the user management table (Ty) (see FIG. 12) managed by the user management part 629, and computes a total attending fee for each of the users by summing the attending fees (computed by the attending fee computing part 622c) of the terminals 10 represented by a corresponding one of the user IDs serving as charging destinations of the attending fees.

For example, as in FIG. 12, the user having the user ID "a123" has the terminals represented by the terminal IDs "11001", "11002", "11003", and the like. Hence, the total attending fee for the user having the user ID "a123" may be computed by summing up the attending fees of the respective terminals 10 represented by the terminal IDs "11001", "11002", "11003", and the like computed by the attending fee computing part 622c.

Next, the charge part 623 is a function or a unit that may be implemented by instructions from the CPU 201, and the network I/F 209 illustrated in FIG. 5. The charge part 623 is configured to refer to the user management table (Ty) illustrated in FIG. 12, and transmit attending fee charging information via electronic mail to a user mail address serving as an attending fee reporting destination from the transmitting-receiving part 621 via the communications network 2. The attending fee charging information includes a total attending fee of all the terminals 10 held by the respective users within a predetermined period, attending year, date, and time, the person who charges the fee such as an administrator, a method of payment, an account number into which the attending fee is to be transferred, and the like.

Processes and Operations of Embodiment

Figure 13:
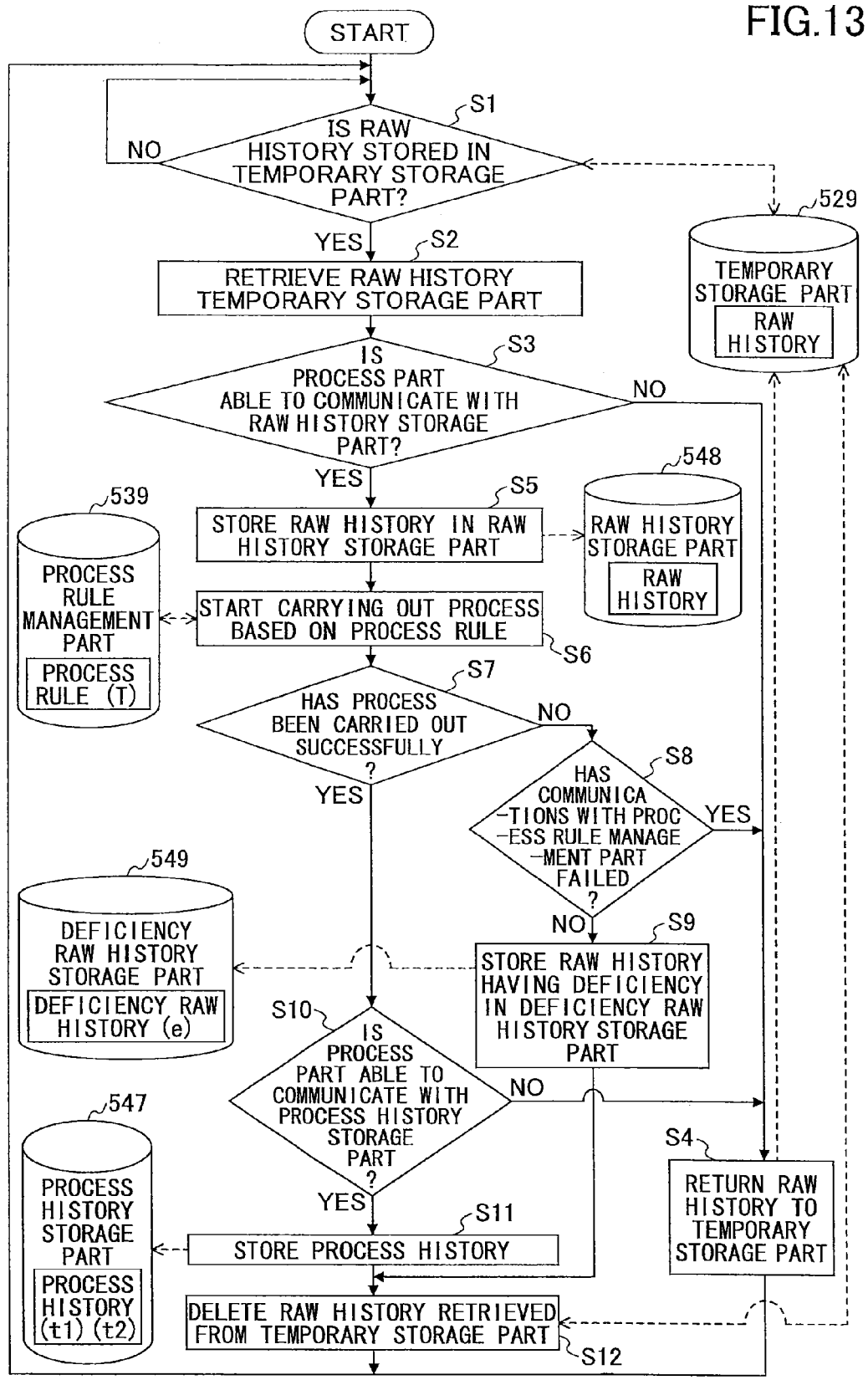
FIG. 13 is a flowchart illustrating a process performed by the management system in which raw history information is processed to create process history information.

Next, a description is given of a process in the transmission system 1 according to the embodiment by referring to FIGS. 1, 7, and 13. FIG. 13 is a flowchart illustrating a process performed by the transmission management system in which raw history information is processed to create process history information.

In FIG. 1, each of the terminals 10 is configured to transmit raw history information indicating a history associating with a communication status to the transmission management system 50 when the communication status is changed. Further, in FIG. 7, the communications management server 510 of the transmission management system 50 is configured to receive the raw history information transmitted from each of the terminals 10 and store the received raw history information in the temporary storage server 520. The transmitting-receiving part 521 of the temporary storage server 520 is configured to receive each of the raw history information sets transmitted from the communications management server 510. The temporary storage part 529 is configured to store the raw history information received by the transmitting-receiving part 521. With this configuration, the temporary storage part 529 is configured to sequentially store the raw history information. In the above configuration, a description is given, with reference to FIG. 13, of a process performed by the transmission management system in which the raw history information is processed to create process history information. Note that the temporary storage server 520 may be configured to directly receive the raw history information from each of the terminals 10.

FIG. 13 is a flowchart illustrating a process performed by the transmission management system in which raw history information is processed to create process history information.

Initially, the process part 532 of the process server 530 determines whether raw history information is stored in the temporary storage part 529 via the LAN 590 (step S1). Subsequently, when the process part 532 determines that the raw history information is NOT stored in the temporary storage part 529 ("NO" in step S1), the process part 532 repeatedly performs the process in step S1.

Next, the process part 532 retrieves the raw history information from the temporary storage part 529 via the LAN 590 (step S2).

Subsequently, the process part 532 determines whether the process part 532 is able to communicate with the raw history storage part 548 (step S3). When the process part 532 determines that the process part 532 is unable to communicate with the raw history storage part 548 ("NO" in step S3), the process part 532 returns the raw history information to the temporary storage part 529 via the LAN 590 (step S4). On the other hand, when the process part 532 determines that the process part 540 is able to communicate with the raw history storage part 548 ("YES" in step S3), the process part 532 stores the raw history information as master data in the raw history storage part 548 of the history management server 540 via the LAN 590 (step S5).

Next, the process part 532 searches the process rule management table (T) for the raw history information retrieved in step S2 as a search key to extract process information corresponding to the retrieved raw history information, and creates process history information indicating a post-process history by carrying out a predetermined process on the raw history information based on the extracted process information (step S6). Note that in step S6, the predetermined process is not carried out on the raw history information having the communications status illustrated in FIG. 9 being "online" or "accept". This is because the process rule management table (T) illustrated in FIG. 8 does not include the communications status "online" or "accept" as the process start requirement. Further, the raw history information may include deficiency (e). In such a case, the raw history information does not appear to be processed normally by the process part 532.

Subsequently, the process part 532 determines whether the process part 532 has successfully carried out the process on the raw history information based on the process contents in step S6 (step S7). Subsequently, when the process part 532 determines that the process part 532 has failed to carry out the process on the raw history information ("NO" in step S7), the process part 532 further determines whether the reason for failing to carry out the process is failure to communicate with the process rule management part 539 (step S8).

Subsequently, when the process part 532 determines that the process part 532 is unable to communicate with the process rule management part 539 ("YES" in step S8), the process part 532 returns the raw history information to the temporary storage part 529 via the LAN 590 (step S4). On the other hand, when the process part 532 determines that the process part 540 is able to communicate with the process rule management part 539 ("NO" in step S8), the process part 532 stores the raw history information having the deficiency (e) in the deficiency raw history storage part 549 of the history management server 540 via the LAN 590 (step S9). Hence, the administrator of the transmission system 1 may be able to consider possible solutions by analyzing the raw history information having the deficiency (e).

Note that the process part 532 returns the raw history information to the temporary storage part 529 for the following reason. Even when the process server 530 is unable to communicate with a process record management part (DB), this communications failure may be considered as temporary database failure unlike failure in a communications network such as LAN. Hence, the raw history information may be stored in the temporary storage part 529 after the process record management part (DB) is restored. Thus, with the above configuration, since the raw history information is subject to processing again, the raw history information having no deficiency (e) may be prevented from failing to be processed.

Further, the process part 532 stores the raw history information in the deficiency raw history storage part 549 when access to the process rule management part 539 always results in errors; for example, when the raw history information has missing information that is necessary for the raw history information. In such a case, the raw history information having deficiency (e) is configured to be stored as an error log in the deficiency raw history storage part 549 instead of returning the raw history information to the temporary storage part 529.

Further, the administrator of the transmission system 1 may be informed of occurrence of the deficiency (e) via electronic mail or the like, instead of, or in combination with returning the raw history information to the temporary storage part 529, or storing the raw history information in the deficiency raw history storage part 549. Hence, the administrator may be able to immediately detect or acknowledge the occurrence of the deficiency (e).

Next, returning back to step S7, when the process part 532 determines that the process part 532 successfully carries out the process on the raw history information ("YES" in step S7), the process part 532 further determines whether the process part 532 is able to communicate with the process history storage part 547 (step S10). Then, when the process part 532 determines that the process part 532 is unable to communicate with the process history storage part 547 ("NO" in step S10), the process part 532 returns the raw history information to the temporary storage part 529 via the LAN 590 (step S4). On the other hand, when the process part 532 determines that the process part 540 is able to communicate with the process history storage part 547 ("YES" in step S10), the process part 532 stores the process history information processed in step S6 in the process history storage part 547 of the history management server 540 via the LAN 590 (step S11).

Next, after the processes performed in steps S9 and S11, the process part 532 completely deletes the raw history information retrieved in step S2 from the temporary storage part 529 of the temporary storage server 520 via the LAN 590 (step S12).

Next, after the processes performed in steps S12 and S4, the process part 532 returns to the process in step S1 to proceed with performing processes subsequent to the process in step S1 on the next raw history information sequentially stored in the temporary storage part 529.

Next, a description is given of a process in which the transmission management system 50 provides the acquisition requested process history information with the acquisition request source terminal when the user terminal 10 requests the transmission management system 50 to acquire process history information, with reference to FIGS. 7, 14 to 16.

Figure 14:
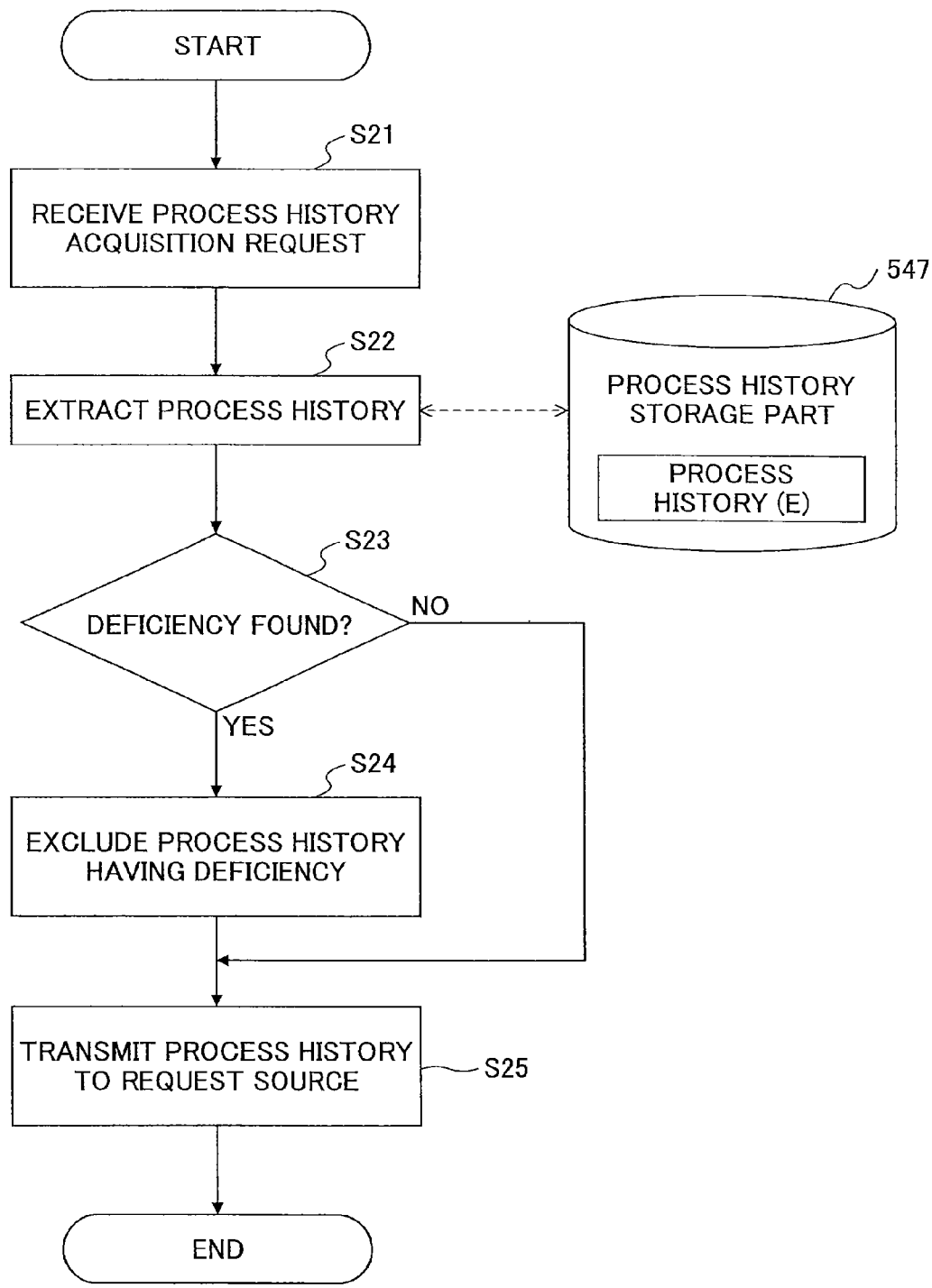
FIG. 14 is a flowchart illustrating a process from receiving an acquisition request for acquiring process history information from a user to providing the user with the process history information.

FIG. 14 is a flowchart illustrating a process from receiving an acquisition request for acquiring process history information from a user of the terminal to providing the user with the process history information. FIG. 15A is a diagram illustrating an acquisition target period of the process history information. FIG. 15B is a diagram illustrating search requirements for searching for raw history information. FIG. 16 is a diagram illustrating an example of a screen displayed on a display of an external input apparatus.

Initially, the transmitting-receiving part 551 of the terminal setting utility server 550 illustrated in FIG. 7 receives from the acquisition request source terminal an acquisition request indicating a request for acquiring process history information relating to the communications in the acquisition request source terminal via the communications network 2 (step S21). The acquisition request includes a terminal ID of the acquisition request source terminal, and the acquisition target period of the process history information (e.g., day, week, month, and year) as search keys (search parameters).

In response to the acquisition request, the search part 542 of the history information management server 540 searches the process history storage part 547 for the process history information corresponding to the acquisition request extracting the corresponding process history information (step S22). Specifically, the search part 542 initially computes an acquisition target range (from_date, to_date) from the acquisition target period. For example, when the acquisition target period is "2010-09", the acquisition target range is from 0 am, Sep. 1, 2010 to 12 pm, Sep. 30, 2010 (i.e., 0 am, Oct. 1, 2010). Hence, the acquisition target range is "from_date"=2010-09-01 00:00:00, "to_date"=2010-10-01 00:00:00. Next, the search part 542 searches the attendee history management table (t1) for process history information (i1) corresponding to the terminal ID, "from_date", and "to_date" based on the search requirements (A, B, C, and D) illustrated in FIG. 15B to extract the corresponding process history information (i1). Next, the search part 542 searches the conference history management table (t2) for process history information (i2) corresponding to a conference ID in the extracted process history information (i1) as a search key to extract the corresponding process history information (i2). Subsequently, the search part 542 merges the extracted process history information (i1) and the process history information (i2) to create process history information (I) to provide the request source terminal with the created process history (I). Further, when there are two or more sets of process history information (I), the search part 542 merges the two or more sets of process history information (I) to create a process history information group (IG).

In the following, a description is given of a search method employed in the above search requirements (A, B, C, and D). The present embodiment enables the transmission management system 50 to carry out a process to provide history information even when a range from the attending date to the exit date may be several months. For example, when there is history information indicating that the user terminal 10 attended a conference on "2010-08-30" (Aug. 30, 2010) and exited the conference on "2010-10-01" (Oct. 1, 2010), the transmission management system 50 may carry out a process to provide process history information of any of months including August, September, and October. That is, the terminal IDs each having a period from the attending date to the exit date that matches the period from "from_date" to "to_date" may be extracting targets among the terminal IDs. In FIG. 15A, all the raw history information sets L1 to L6 may be extracting targets. More specifically, the extracting targets may be classified by four cases corresponding to the search requirements (A, B, C, and D) illustrated in FIG. 15B. With the above-described classification of the target requirements, the search range may be limited by each of the search requirements. Thereafter, desired raw history information may be extracted in a fewer search hours by integrating the search requirements with logical "OR". Note that the search requirements illustrated in FIG. 15B represent the following cases.

(1) Search requirement A: a case where the attending date of the conference falls within the acquisition target month. The search range of the attending dates may be limited to the acquisition request target month.

(2) Search requirement B: a case where the exit date of the conference falls within the acquisition target month. The search range of the exit dates may be limited to the acquisition request target month.

(3) Search requirement C: a case where the user terminal 10 attends the conference before the acquisition request target month, and is still attending the conference. The search range of the exit dates may be limited to "the conference in progress". Further, only one raw history information indicating the "conference in progress" may be included in the specific terminal 10 unless the terminal 10 attends another conference differing from the currently attended conference.

(4) Search requirement D: a case where the period from the attending date to the exit date includes several months. The raw history information to be searched for may be limited based on the requirement indicating the "attending hours being (to_date-from_date) or above" (i.e., one month or above in this case).

Note that this embodiment illustrates an example in which the raw history information may be extracted when the acquisition request target period is monthly (e.g., "2010-09"). However, the raw history information may be extracted by the same search method when the acquisition request target period is daily period (e.g., "2010-09"), yearly (e.g., "2010"), or any specified period (e.g., "2010-09 00:00:00" to "2010-09 12:00:00:00"). Further, FIG. 15B illustrates an example in which raw history information is searched for by a terminal ID of a certain acquisition request source terminal. However, the raw history information may be searched for by terminal IDs of two or more acquisition request source terminals. Alternatively, the raw history information may be searched for by parameters other than the terminal ID of the acquisition request source terminal or the acquisition target period.

Next, illustration is given of a case where the transmission management system 50 provides the acquisition request source terminal with a process history information group (IG).

Subsequently, the deficiency history excluding part 543 determines whether the process history information group (IG) includes process history information (I) having deficiency (E) (step S23). In step S23, the deficiency history excluding part 543 determines that the process history information group (IG) includes the process history information (I) having deficiency (E) ("YES" in step S23), and the deficiency history excluding part 543 excludes the process history information (I) having the deficiency (E) alone (step S24). Hence, the transmission management system 50 may be able to prevent the acquisition request source terminal from being provided with the process history information having deficiency.

Note that in the present embodiment, the raw history information is transmitted from each of the user terminals 10 in the order of communications statuses "invite", "start", "join", "leave", and "end". Hence, the deficiency history excluding part 543 refers to items of the "organizer terminal ID", "start date and time", "attending date and time", "exit date and time", and "end date and time" equating with the communications statuses in a reverse order of a transmitting order of these items. Then, when there is an item having no communications status before the item having the communications status, the deficiency history excluding part 543 determines that the process history information includes deficiency (E). The rule indicating the above-described determination may be represented by an electronic file managed outside the deficiency history excluding part 543.

Next, after step S24 or when the deficiency history excluding part 543 determines that there is no deficiency in step S23 ("NO" in step S23), the transmitting-receiving part 541 of the history management server 540 transmits the process history information group (IG) to the terminal setting utility server 550, and the transmitting-receiving part 551 of the terminal setting utility server 550 transmits the received process history information group (IG) to the acquisition request source terminal (step S25).

On the other hand, with respect to the above step S25, a browser function of the external input apparatus 40 displays a "communications terminal setting utility" screen 1000 illustrated in FIG. 16 on the display 208 of the external input apparatus 40 connected to the acquisition request source terminal. The communications terminal setting utility screen 1001 displays the terminal ID 110001 of the user terminal 10, the period 1002 of the history relating to the communications indicated in the process history information, an acquisition target period switching menu 1003 of the acquisition requested process history information, the process history information group (IG) 1004, and the like.

Specifically, in an example of the screen illustrated in FIG. 16, the external input apparatus 40 logs into the terminal setting utility server 550 with the terminal ID of the acquisition request source terminal is "110001". When the user requests acquiring the process history information, the user selects "September, 2010" from the acquisition target period switching menu 1003. Hence, the external input apparatus 40 causes the acquisition request source terminal to request the transmission management system 50 to acquire the process history information based on the requirement of the terminal ID "1100001", and the acquisition target period "2010-09". Accordingly, the external input apparatus 40 causes the display 208 of the external input apparatus 40 to display the screen 1001 illustrated in FIG. 16 based on the process history information group (IG) transmitted from the transmission management system 50 via the request source terminal.

Further, the acquisition of the process history information may be requested based on the changed acquisition target period every time the acquisition target period switching menu 1003 is selectively switched, or every time one of triangular buttons displayed on the opposite sides of the acquisition target period switching menu 1003 is pressed.

Note that when the conference history relating to the process history information is recorded over several months, the conference history is displayed as follows. The following three cases are illustrated when the attending date and time are "2010-08/30 22:00:00" (Aug. 30, 2010), and the exit date and time are "2010-10-01 10:00:00" (Oct. 1, 2010).

(1) A case where the communications histories are displayed as they are.
 (1-1) the communications history in August is displayed as the attending date and time "2010-08-30 22:00:00", and the exit date and time "2010-10-01 10:00:00".
 (1-2) the communications history in September is displayed as the attending date and time "2010-08-30 22:00:00", and the exit date and time "2010-10-01 10:00:00".
 (1-3) the communications history in October is displayed as the attending date and time "2010-08-30 22:00:00", and the exit date and time "2010-10-01 10:00:00".

(2) A case where all the attending dates and times and the exit dates and times are displayed, but those at the boundary between the two months are trimmed (deleted). Note that the trimming process may be carried out by the auxiliary function part 552 of the terminal setting utility server 550, or the search part 542 of the history management server 540.
 (2-1) the communication history in August is displayed as the attending date and time "2010-08-30 22:00:00", and the exit date and time "2010-08-31 23:59:59".
 (2-2) the communication history in August is displayed as the attending date and time "2010-09-01 00:00:00", and the exit date and time "2010-09-30 23:59:59".
 (2-3) the communication history in October is displayed as the attending date and time "2010-10-01 00:00:00", and the exit date and time "2010-10-01 10:00:00".

(3) A case where the attending dates and times and the exit dates and times bridging the two months are trimmed such that the attending dates and times and the exit dates and times are not displayed (i.e., the attending dates and times and the exit dates and times at the boundary between the two months are displayed as "<--", "-->").
Note that the trimming process may be carried out by the auxiliary function part 552 of the terminal setting utility server 550, or the search part 542 of the history management server 540.
 (3-1) the communication history in August is displayed as the attending date and time "2010-08-30 22:00:00", and the exit date and time "-->".
 (3-2) the communication history in September is displayed as the attending date and time "<--", and the exit date and time "-->".
 (3-3) the communication history in October is displayed as the attending date and time "2010-08-30 22:00:00", and the exit date and time "2010-10-01 10:00:00".

Since the communication log transmission side does not have to wait for the end of a log forming process by receiving the transmission of the communication log as a message queue (messaging system of asynchronous communications), the primary process including the communication control will not be adversely affected.

Figure 17:
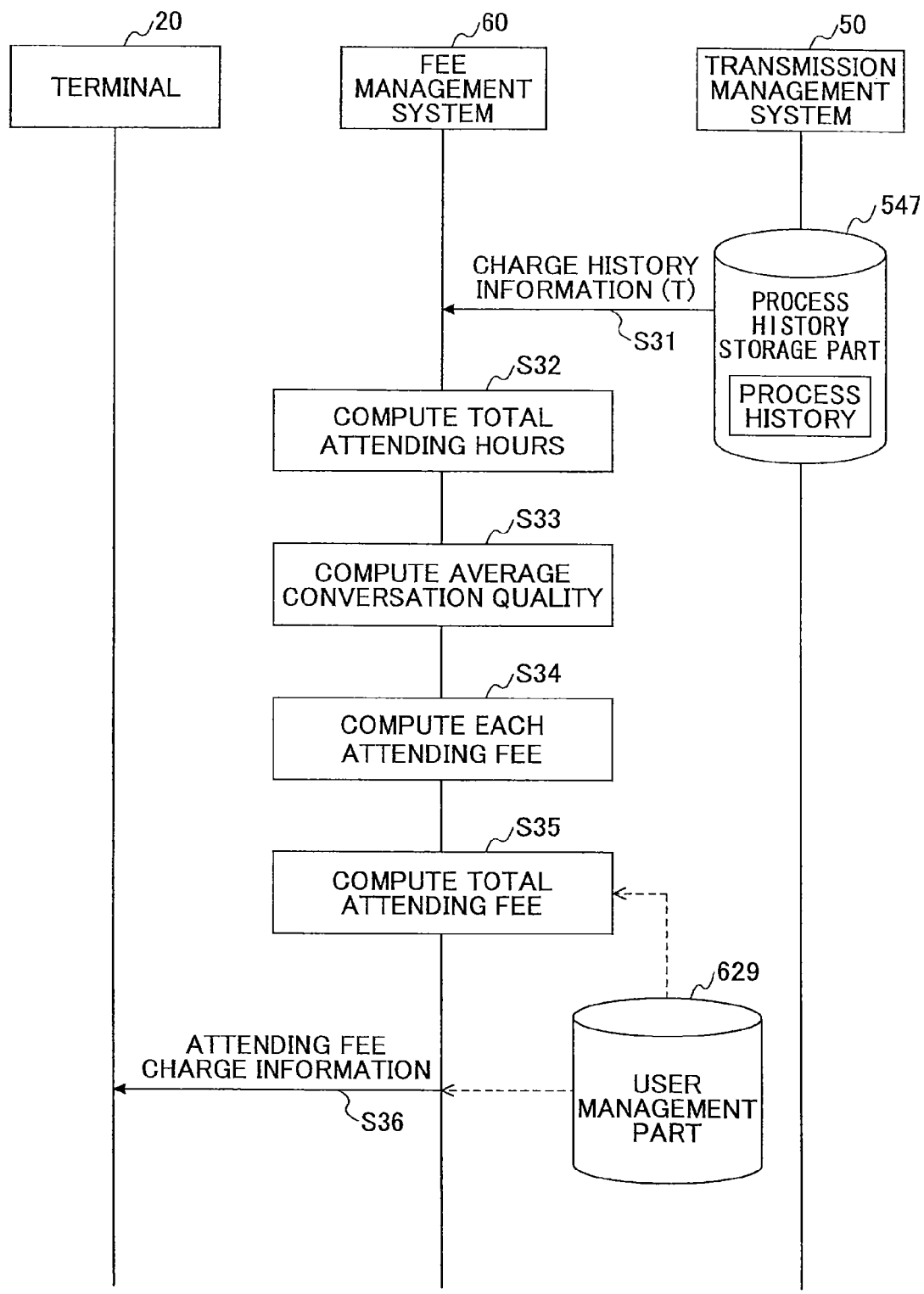
FIG. 17 is a sequence diagram illustrating a fee charge method.

Next, a description is given, with reference to FIGS. 11, 17 and 18, of a process in which the administrator of the transmission management system 1 charges the users of the transmission management system 1 the attending fee resulting from the user attending the teleconference. FIG. 17 is a sequence diagram illustrating a fee charge method. FIG. 18 is a schematic diagram illustrating a summary of attending fees.

Note that the user (or user unit) in FIG. 18 does not indicate a unit per user of the terminal 10 but indicates a unit per user who pays the attending fee. The example in FIG. 1 assumes a case in which the four offices of a Tokyo office, an Osaka office, a New York office, and a Washington, D.C. office separately pay the attending fees.

Initially, the transmission management system 50 transmits each terminal ID and corresponding charge history information (i) to the fee management system 60 via the dedicated line 2x(step S31). Then, the fee management system 60 receives the charge history information (i) for each of the terminals 10. Specifically, in the fee computing server 620 of the fee management system 60, the transmitting-receiving part 621 receives each of the terminal IDs and corresponding charge history information (i) from the process history storage part 547 of the history information management server 540 in the transmission management system 50 via the transmitting-receiving part 541, the LAN 590, the transmitting-receiving part 571, the dedicated line 2x, the transmitting-receiving part 612, the LAN 690, and the transmitting-receiving part 621 in sequence. Note that the fee management system 60 side may request the transmission management system 50 to transmit the charge history information (i), or the transmission management system 50 may regularly (e.g., the first of each month) transmit the charge history information (i) to the fee management system 60. Note that as described above, the charge history information (i) includes attending hours information (pi) and conversation quality information (si).

Subsequently, the attending hours computing part 622a sums up each of the attending hours values represented by the "attending hours" of a corresponding one of terminal IDs based on the attending hours information (pi) of a predetermined period (e.g., one day period) acquired from the history information management server 540 to compute total attending hours for each of the terminals 10 within the predetermined period (step S32).

Then, the conversation quality computing part 622b acquires each of the conversation quality values represented by the "conversation quality" of a corresponding one of terminal IDs based on the conversation quality information (si) of a predetermined period (e.g., one day period) acquired from the history information management server 540. The conversation quality computing part 622b then computes the average of the conversation quality values per unit time as an average conversation quality per unit time within the predetermined period (step S33).

Next, the attending fee computing part 622c computes an attending fee for each of the terminals 10 within the predetermined period based on the total attending hours computed in step S32 and the average conversation quality per unit time computed in step S33 (step S34).

For example, there is a case where the administrator determines an attending fee per minute being ten yen in advance. In this case, when the total attending hours of any one of the terminals 10 computed by the attending hours computing part 622a is 160 min, and the average conversation quality per unit time is 91, the attending fee may be computed as follows: 10×160×0.91=1456 yen.

Subsequently, the attending fee summing part 622d of the computing part 622 refers to the user management table (Ty) (see FIG. 12) managed by the user management part 629, and computes a total attending fee for each of the users by summing the attending fees (computed in step S34) of the terminals 10 represented by a corresponding one of the user IDs serving as charging destinations of the attending fees (step S35).

For example, in FIG. 12, the terminal IDs corresponding to the user ID "a123" are "11001", "11002", "11003", and the like. Hence, the total attending fee of the user represented by the user ID "a123" may be computed by summing the attending fees of the terminals 10 represented by "11001", "11002", "11003", and the like computed in step S32.

Thus, the fee management system 60 may be able to compute the total attending fee for each of the users as illustrated in FIG. 18.

Next, the charge part 623 of the fee management system 60 refers to the user management table (Ty) illustrated in FIG. 12, and transmits the attending fee charging information via electronic mail to the user terminal 20 having the user mail address serving as an attending fee reporting destination (step S36). The attending fee charging information includes the total attending fee for each of the users illustrated in FIG. 18 such that each user may be able to acknowledge the total attending fee that he or she is obliged to pay.

Main Effects of Embodiments

As described above, the embodiments of the present invention may compute the total attending fee for each of the users attending the conversation (conference) based on the total attending hours and the conversation quality. Hence, the administrator of the transmission system 1 may be able to charge the attending fee by hours of the user attending the conversation in the conference and by conversation quality while the user having conversations (communication) in conference. Accordingly, the embodiments of the present invention may be able to provide advantageous effects of charging the users the fees in a fair manner.

Note that the conversation quality may be greatly affected by the network circuitry quality. The degradation of the network circuitry may result in sound interruption, image skipping, or the like. However, the conversation quality is not limited to that determined based on the network circuitry quality alone. That is, the conversation quality indicates the quality of the conversation that the user has eventually received via the terminal 10 side regardless of the causes of the conversation quality degradation. Hence, when the conversation quality is degraded (low) due to the delay or the deficiency of the various servers managed by the administrator, the attending fee to be charged is determined based on such low quality conversation quality. In this method, the fees may be charged in a fairer manner between users.

Further, the transmission management system 50 creates the process history information and stores the created process history information prior to receiving from each of the terminals 10 the acquisition request for acquiring the process history information relating to the communications in the corresponding terminal 10. Hence, the transmission management system 50 may be able to rapidly provide the acquisition request source terminal 10 with the process history information when receiving the acquisition request for acquiring the process history information from each of the terminals 10.

Moreover, the conversation session seim may be continued by bridging the two months (e.g., bridging August and September, or bridging September and October). In such a case, even if the process history information of September alone is requested by the user, the transmission management system 50 may be unable to acquire the raw history information having the communication status being "join" or "leave" within September by searching for the raw history information having such a communication status being "join" or "leave" within September alone. Hence, the transmission management system 50 initially searches for the raw history information sets having the communication status being "join" indicating that the communications have been initiated before September, and further specifies one of the raw history information sets based on a predetermined conference ID(x). Subsequently, the transmission management system 50 initially searches for the raw history information sets having the communication status being "leave" indicating that the communications have been finished before September, and further specifies one of the raw history information sets based on a conference ID identical to the above-described predetermined conference ID(x). Accordingly, the transmission management system 50 may need a long time to search for the corresponding raw history information to create process history information. However, in this embodiment, the search time may be reduced by employing the search method illustrated in FIGS. 15A and 15B, and hence, the process history information may be created rapidly.

Other Embodiments

The process part 532 may add a "deficiency flag" to the attributes of the attendee history management table (t1) illustrated in FIG. 10A to create an attendee history management table (t11) illustrated in FIG. 19A. Likewise, the process part 532 may add a "deficiency flag" to the attributes of the conference history management table (t2) illustrated in FIG. 10B to create a conference history management table (t12) illustrated in FIG. 19B. In such a case, the deficiency history excluding part 543 illustrated in FIG. 7 may determine whether there is deficiency (E) in the process history information stored in the process history storage part 547 prior to receiving the acquisition request for acquiring process history information from the terminal 10. When the deficiency history excluding part 543 determines that there is no deficiency (E) in the process history information, the deficiency history excluding part 543 inputs "0" as search result information to the attribute of the "deficiency flag" of each record illustrated in FIGS. 19A and 19B. On the other hand, when the deficiency history excluding part 543 determines that there is deficiency (E) in the process history information, the deficiency history excluding part 543 inputs "1" as the search result information into the attribute of the "deficiency flag". Accordingly, the communication management server 510 may be able to receive the process history information sets from the history management server 540 by excluding the process history information having the "deficiency flag" being "1". Further, it may be unnecessary for the deficiency history excluding part 543 to determine whether there is deficiency in the process history information after receiving the acquisition request for acquiring the process history information from the acquisition request source terminal. Hence, the acquisition request source terminal may be able to acquire the process history information rapidly. Note that in the above example, "0" indicates normal, and "1" indicates deficiency (abnormal); however, the normal and deficiency may be indicated by any representations such as "true" and "false", or "normal" and "deficiency" insofar as whether the process history information includes deficiency or not is clarified by such representations.

Further, the history information management server 540 may include a plurality of combinations each including the temporary storage part 529, the process part 532, and the process history storage part 547 illustrated in FIG. 7, and plural types of process history information may be created from one raw history information set by sequentially transferring the raw history information, the process history information, and the like with a message relay to various temporary storage parts 529.

Further, in the transmission management system 50, the communication management server 510, the temporary storage server 520, the plural process servers 530, the history management server 540, and the terminal setting utility server 550 are illustrated as separate servers; however, the transmission management system 50 is not limited to the configuration having the separate servers. The transmission management system 50 may include any one or more integrated functions of the above servers.

Further, each of the relay device 30, the external input apparatus 40, the transmission management system 50, the fee management system 60, the program providing system 90, and the maintenance system 100 may be composed of a single computer, or plural computers to which any functions of the above components are allocated. Further, when the program providing system 90 is composed of a single computer, the program transmitted by the program providing system 90 may be transmitted by being divided into plural modules or without being divided. In addition, when the program providing system 90 is composed of plural computers, the divided modules of the program may be transmitted from separate computers.

Moreover, a recording medium integrally storing or different recording media separately storing respective programs of the relay device 30, the external input apparatus 40, the transmission management system 50, the fee management system 60, the program providing system 90, and the maintenance system 100; the hard disk (HD) 204 integrally storing or separately storing the respective programs; and the program providing system 90 having the HD 204 may be used when domestically or internationally providing the users with the programs as a program product.

Further, an example of the transmission system 1 is illustrated as a teleconference system in the above embodiments. However, the example of the transmission system 1 is not limited to the teleconference system, and may be a telephone system such as an internet protocol (IP) phone or an Internet phone. Alternatively, the transmission system 1 may be a car navigation system. In such a case, one of terminals 10 corresponds to a car navigation apparatus installed in a vehicle, and the other one of the terminals 10 corresponds to a management terminal or a management server in a management center of the car navigation, or another car navigation apparatus installed in another vehicle. Further, a history relating to calls in a certain period may be a communications history or a call history of a mobile phone.

The embodiments of the present invention may provide the fee management system, the transmission system, and the non-transitory recording medium storing the fee management program, which may be able to charge the users fees in a fair manner.

Note that components, or any combinations of expressions or the components of the present invention that are applied to a method, an apparatus, a system, a computer program, a recording medium, and the like may be effective as aspects of the invention.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device.

The hardware platform includes any desired kind of hardware resources including, for example, a central processing unit (CPU), a random access memory (RAM), and a hard disk drive (HDD). The CPU may be implemented by any desired kind of and any desired number of processors.

The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as cache memory of the CPU, and the RAM may function as a physical memory or a primary memory of the apparatus, while the HDD may function as a secondary memory of the apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

The present application is based on and claims the benefit of priority of Japanese Priority Application No. 2013-038766 filed on Feb. 28, 2013, the entire contents of which are hereby incorporated by reference.

What is claimed is:

1. A transmission management system, comprising:
a plurality of transmission terminals configured to mutually transmit information associated with a video conference conversation between the plurality of transmission terminals, wherein the plurality of transmission terminals comprise conversation quality determining units configured to determine actual conversation quality information indicating actual conversation communication service quality of audio and video provided during the video conference conversation with respect to a predetermined standard of conversation communication service quality, wherein the actual conversation quality information is based in part on an amount of sound interruption, an amount of image skipping and an average actual image resolution achieved during the video conference conversation, wherein the average actual image resolution is determined based on received pixel information; and
a fee management system configured to manage attending fees that are charged when the plurality of transmission terminals attend the video conference conversation, wherein the fee management system includes:
a receiver configured to receive attending hours information and the actual conversation quality information, the attending hours information indicating attending hours for which each of the transmission terminals attended the video conference conversation; and
processing circuitry configured to:
compute total attending hours based on the attending hours information, the total attending hours indicating hours for which the respective terminals attended the conversation, and
compute an attending fee for each of the terminals based on the corresponding total attending hours and the actual conversation quality information.

2. The transmission management system as claimed in claim 1, wherein the processing circuitry is further configured to:
compute an average conversation quality of the video conference conversation attended by the terminals based on the actual conversation quality information, and
compute the attending fee for each of the terminals based on the corresponding total attending hours and the computed average conversation quality of the terminal.

3. The transmission management system as claimed in claim 1, wherein the processing circuitry is further configured to
manage user identification information for identifying a user of each of the terminals and terminal identification information for identifying the terminal used by the user by associating the user identification information with the terminal identification information, and
compute the total attending fee of the user by summing the attending fee of each of the terminals represented by the user identification information, for each of the users.

4. The transmission management system as claimed in claim 3, wherein the processing circuitry is further configured to:
transmit an electronic mail for charging the total attending fee to an electronic mail address corresponding to the user identification information of the user who is charged for the total attending fee, and
manage the electronic mail address of the user represented by the user identification information, for each of the users.

5. A transmission management method, comprising:
transmitting, by a plurality of transmission terminals, information associated with a video conference conversation between the plurality of transmission terminals,
determining, by conversation quality determining units in the plurality of transmission terminals, actual conversation quality information indicating actual conversation communication service quality of audio and video provided during the video conference conversation with respect to a predetermined standard of conversation communication service quality, wherein the actual conversation quality information is based in part on an amount of sound interruption, an amount of image skipping and an average actual image resolution achieved during the video conference conversation, wherein the average actual image resolution is determined based on received pixel information;
managing, by a fee management system, attending fees that are charged when the plurality of transmission terminals attend the video conference conversation;
receiving, by a receiver of the fee management system, attending hours information and the actual conversation quality information, the attending hours information indicating attending hours for which each of the transmission terminals attended the video conference conversation;
computing, by processing circuitry of the fee management system, total attending hours based on the attending hours information, the total attending hours indicating hours for which the respective terminals attended the conversation; and
computing, by the processing circuitry of the fee management system, an attending fee for each of the terminals based on the corresponding total attending hours and the actual conversation quality information.

6. The transmission management method as claimed in claim 5, further comprising:
- computing an average conversation quality of the video conference conversation attended by the terminals based on the actual conversation quality information; and
- computing the attending fee for each of the terminals based on the corresponding total attending hours and the computed average conversation quality of the terminal.

7. The transmission management method as claimed in claim 5, further comprising:
- managing user identification information for identifying a user of each of the terminals and terminal identification information for identifying the terminal used by the user by associating the user identification information with the terminal identification information; and
- computing the total attending fee of the user by summing the attending fee of each of the terminals represented by the user identification information, for each of the users.

8. The transmission management method as claimed in claim 7, further comprising:
- managing an electronic mail address of the user represented by the user identification information, the electronic mail address being managed for each of the users; and
- transmitting an electronic mail for charging the total attending fee to the electronic mail address corresponding to the user identification information of the user who is charged for the total attending fee.

* * * * *